United States Patent [19]
Marinelli

[11] Patent Number: 6,148,271
[45] Date of Patent: *Nov. 14, 2000

[54] SPEED, SPIN RATE, AND CURVE MEASURING DEVICE

[75] Inventor: Dave Marinelli, Superior, Colo.

[73] Assignee: Silicon Pie, Inc., Superior, Colo.

[*] Notice: This patent is subject to a terminal disclaimer.

[21] Appl. No.: 09/007,241

[22] Filed: Jan. 14, 1998

[51] Int. Cl.[7] .................................................. G01P 15/00
[52] U.S. Cl. ....................... 702/141; 702/149; 702/150; 702/151; 473/198; 473/200; 473/570
[58] Field of Search ..................... 702/141, 142, 702/149, 150, 151; 473/198, 200, 570

[56] References Cited

U.S. PATENT DOCUMENTS

| | | | |
|---|---|---|---|
| 4,775,948 | 10/1988 | Dial et al. | 364/565 |
| 5,526,326 | 6/1996 | Fekete et al. | 368/10 |
| 5,564,698 | 10/1996 | Honey et al. | 273/128 R |
| 5,761,096 | 6/1998 | Zakutin | 364/565 |
| 5,779,576 | 7/1998 | Smith, III et al. | 473/570 |

*Primary Examiner*—Marc S. Hoff
*Assistant Examiner*—Hien Vo
*Attorney, Agent, or Firm*—James R. Young

[57] ABSTRACT

A device for measuring a movable object, such as a baseball, football, hockey puck, soccer ball, tennis ball, or a golf ball. Part of the device, called the object unit, is embedded, secured, or attached to the movable object of interest, and consists of an accelerometer network, electronic processor circuit, and a radio transmitter. The other part of the device, called the monitor unit, is held or worn by the user and serves as the user interface for the device. The monitor unit has a radio receiver, a processor, an input keypad, and an output display that shows the various measured motion characteristics of the movable object, such as the distance, time of flight, speed, trajectory height, spin rate, or curve of the movable object, and allows the user to input data to the device.

60 Claims, 18 Drawing Sheets

SPEED, SPIN RATE, AND CURVE MEASURING DEVICE

CROSS REFERENCE TO RELATED APPLICATIONS

This application is related to application Ser. No. 09/007,240 of Dave Marinelli filed on Jan. 14, 1998 entitled A Time of Motion, Speed, and Trajectory Height Measuring Device.

FIELD OF THE INVENTION

This invention relates to measuring motion characteristics of movable objects and more particularly to measuring the speed, spin rate, and curve of a movable object. Even more particularly, the invention relates to measuring the speed, spin rate, and curve of a movable object, such as a baseball, football, hockey puck, soccer ball, tennis ball, or golf ball by utilizing an embedded, secured, or attached object unit and an external monitor unit.

BACKGROUND OF THE INVENTION

Participants of many sports, including baseball, football, soccer, hockey, tennis, and golf, and their coaches, are often interested in knowing the motion characteristics of the object used in a sport, such as the distance, time of flight, speed, height, spin rate, or curve of thrown, kicked, or batted balls and slapped hockey pucks. Typically, the speed of a moving ball is measured using a Doppler radar system. Doppler radar systems determine a moving ball's speed by analyzing radar beams reflected off the ball. Although accurate, these systems are expensive and normally cannot be operated by the athlete whose toss or hit is being measured. For these reasons, systems of this type are generally restricted to organized sport teams. Also, Doppler radar systems are not able to measure the spin rate of the ball of interest. Spin rate information is useful for example in optimizing a baseball pitcher's curve ball pitching ability.

Several other methods for measuring the motion characteristics of moving objects have been proposed over the years that rely on devices wholly external to the moving object. Another approach to the problem involves placing a measurement device within the moving object. Two such systems are described in U.S. Pat. No. 4,775,948 issued on Oct. 4, 1988 to Dial et al. entitled "Baseball Having Inherent Speed-Measuring Capabilities", the '948 patent, and U.S. Pat. No. 5,526,326 issued on Jun. 11, 1996 to Fekete et al. entitled "Speed Indicating Ball", the '326 patent. The '948 patent involves placing an electronic timer and calculator within the ball. The timer measures the ball's time of flight over a measured distance, and on that basis determines the ball's speed. It then displays the speed on the surface of the ball via a liquid crystal display. The '326 patent suggests that a more economical and durable method of accomplishing the same task is met by using mechanical means internal to a ball for determining time of flight and speed.

Neither of these systems previously proposed, however, combine the desirable characteristics of being economical, durable, simple to operate by the athlete, and transparent to that athlete in terms of the feel of the ball and the ball's flight performance. And neither of the systems proposed are able to measure the ball's spin rate or curve. The embedded electronic timer with an LCD display proposed in the '948 patent is vulnerable to strikes against the ground, a glove, or a bat, and is very difficult to manufacture without altering the balance, feel, and flight performance of a ball. The mechanical solution proposed in the '326 patent claims to be more durable, but alters a ball's physical characteristics even more because of its voluminous design. In addition, it splits a ball into two halves that must be wound relative to each other by the player. The two halves must be held in this position until released in a toss. This design is not transparent to the user and alters the physical structure, balance, and flight performance of a ball significantly. Also, the mechanical design cannot be applied to moving objects that are not held by a player, such as a hockey puck.

It is thus apparent that there is a need in the art for an improved measuring method or apparatus which does not significantly or materially alter the moving object in question's physical characteristics or flight performance, is inexpensive, durable, applicable to many different types of sports equipment and other movable objects, measures many different motion characteristics, and is operable by the person doing the throwing, kicking, hitting, or batting. The present invention meets these and other needs in the art.

This application is related to application Ser. No. 09/007,240 of Dave Marinelli filed on Jan. 14, 1998 entitled A Time of Motion, Speed, and Trajectory Height Measuring Device, which is incorporated herein by reference for all that is disclosed and taught therein.

SUMMARY OF THE INVENTION

It is an aspect of the present invention to measure the distance, time of flight, speed, trajectory height, spin rate, or curve of a movable object utilizing an attached object unit in the movable object that emits radio signals and an external monitoring unit that receives radio signals.

It is another aspect of the invention to utilize modulated radio frequencies with an identification code to minimize interference.

Yet another aspect of the invention is to be able to measure a plurality of movable objects with a plurality of attached object units and at least one monitor unit.

Still another aspect of the invention is to utilize acceleration sensors arranged in an accelerometer network to detect is spin of a movable object.

A further aspect of the invention is to utilize acceleration sensors arranged in an accelerometer network to measure the centrifugal g-forces of a spinning movable object.

A still further aspect of the invention is to measure motion characteristics of a movable object in such a way as to not significantly alter the physical characteristics and flight performance of the movable object being measured.

Another further aspect of the invention is to send data from the movable object to the monitor unit by having the object unit reflect and modulate a radio signal generated by the monitor unit (a technique known as modulated backscatter).

The above and other aspects of the invention are accomplished in a device for measuring the motion characteristics, such as distance, time of flight, speed, trajectory height, spin rate, or curve, of a movable object, such as a baseball, football, hockey puck, soccer ball, tennis ball, or golf ball. Part of the device, called the object unit (also referred to as the projectile unit), is embedded, secured, or attached to the movable object of interest. The other part of the device, called the monitor unit (also referred to as the receiving unit), is held or worn by the user and serves as the user interface for the device. The monitor unit displays the various measured motion characteristics of the movable object and allows the user to input data to the device.

The object unit has an acceleration sensor network, electronic processor circuit, battery, and radio transmitter that can be wholly and invisibly embedded, secured, or attached in the center of a substantially solid movable object, such as a baseball, golf ball, or hockey puck, or attached or suspended inside a deformable movable object, such as a football, soccer ball, or tennis ball. Its size and construction can yield a baseball, football, hockey puck, soccer ball, tennis ball, or golf ball that looks, feels, and flies as normal baseballs, footballs, hockey pucks, soccer balls, tennis balls, or golf balls.

The monitor unit has a radio receiver, a processor, an output display, and a keypad for user input. It provides a readout of distance, time of flight, speed, trajectory height, spin rate, or curve of a movable object. The monitor unit may be constructed similar to a wristwatch, stopwatch, or a pocket sized calculator for portability, and can provide visual or audio readouts.

In another embodiment the object unit has a passive radio transmitter and the monitor unit has a radio transmitter/receiver that emits a continuous radio frequency sine wave. The passive transmitter is powered by the electromagnetic energy in the monitor unit's transmissions. The object unit reflects back the monitor unit's transmissions and modulates the signal with elapsed time, g-force data, and identification code data. This technique, referred to as modulated backscatter, is commonly used with Radio Frequency Identification (RFID) devices. Although the monitor unit's design complexity is increased using this technique, the object unit's transmitter design is simplified and uses little internal energy.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
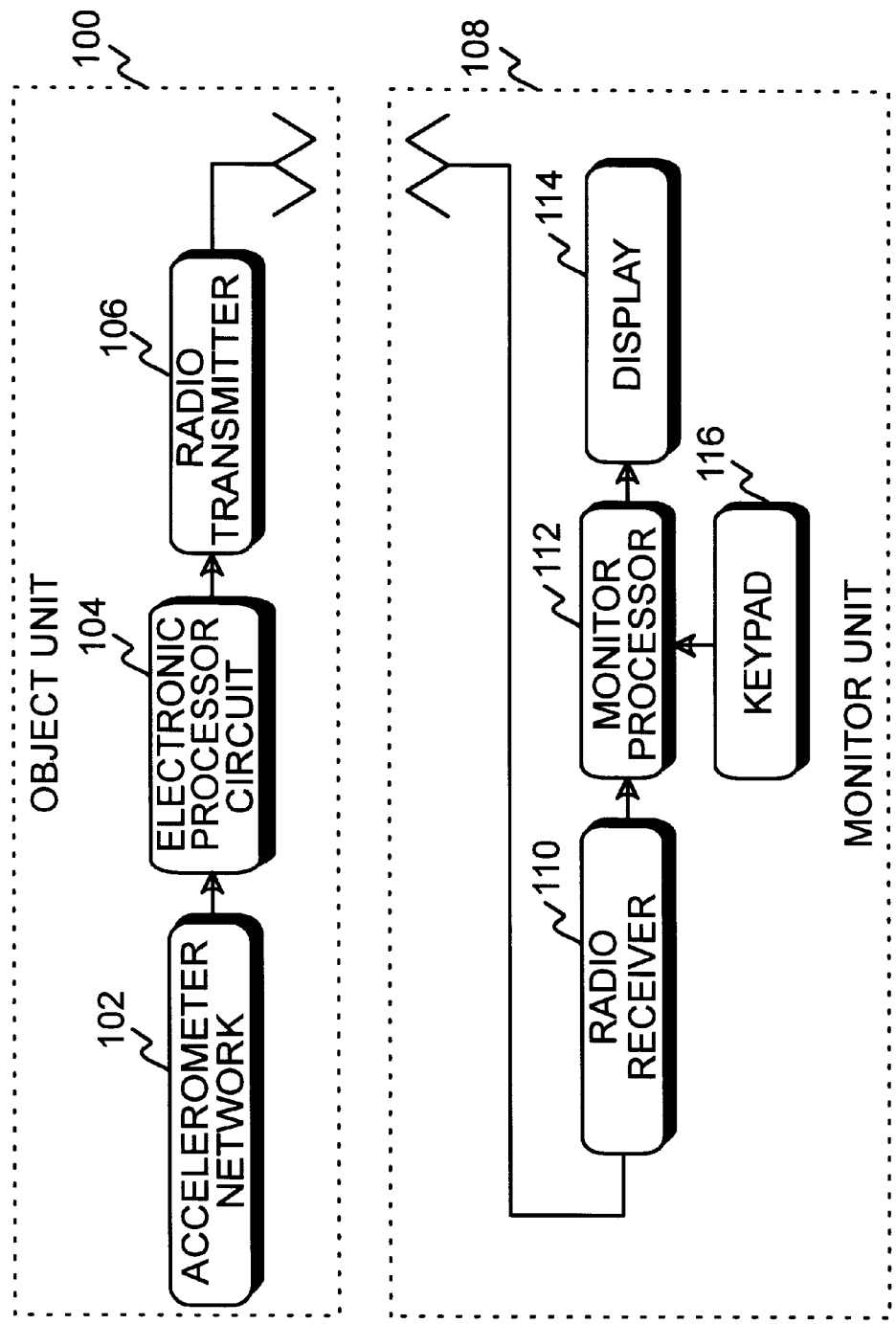
FIG. 1 shows a block diagram of a device for measuring the speed, spin rate, and curve of a movable object of the present invention.

FIG. 1 shows a block diagram of a device for measuring speed, spin rate, and curve of a movable object. Referring now to FIG. 1, the invention comprises two main parts: object unit 100 and monitor unit 108. The intent of the invention is to provide the user with statistics about the trajectory of a spinning movable object. Object unit 100 has an accelerometer network 102 that communicates through electronic processor circuit 104 to radio transmitter 106. Accelerometer network 102, embedded along with the other components of object unit 100 within or attached to a movable object, detects centrifugal force, that is, acceleration generated by rotation about an axis.

Since the electronics embedded, secured, or attached within object unit 100 are not accessible to the user, battery conservation is paramount. For a baseball there can be no physically accessible switch to turn the unit on or off as this would compromise the physical attributes of the baseball. Aside from employing low power design techniques and components, four strategies may be used to facilitate a long useful life for the embedded electronics.

1. Usage Detector With Auto-Shutoff—For a baseball, for example, it is possible to detect usage by way of motion. Motion sensing may be done using the same acceleration detectors used to detect pitches or, if useful for further energy conservation, a different type of sensor such as a mechanical on/off switch that is triggered by motion could be used. Once triggered, the circuit will remain 'alive' in a higher energy usage state for a predetermined period of time, say one minute, unless motion is again detected before the minute expires, in which case the circuit is alive again for another minute.

2. RF Remote Control On Switch With Auto-Shutoff—
The object unit would contain an RF receiver as well as a
transmitter. The monitor unit would contain an RF transmitter as well as a receiver. When the user presses a "TURN
ON BALL" button on the monitor unit (not shown in FIG.
2), an RF signal is sent to the object unit that turns on the
object unit's internal electronics. Once on, the circuit would
remain on as long as motion was detected within a specific
interval, such as one minute. If one minute passes without
detecting motion, the circuit would shut itself off and could
only be re-awakened by the user pressing the "TURN ON
BALL" button again.

3. Magnetically Coupled Switch With Auto-Shutoff—
Application of an external magnet to a specific spot on the
surface of a baseball, for example, would trigger a magnetically sensitive switch that would activate the internal electronics. Once on, the circuit would remain on as long as
motion was detected within a specific interval, such as one
minute. If one minute passes without detecting motion, the
circuit would shut itself off and could only be re-awakened
by application of the magnet.

4. Inductively Coupled Charging Circuit—An internal
rechargeable battery could be charged by transferring energy
inductively from a coil external to the object unit to a
receiving coil internal to the object unit. This implies that an
inductive charging unit is provided with the invention and
that the object unit must occasionally be placed in the
inductive charger.

Monitor unit 108 has a radio receiver 110 that communicates with a monitor processor 112. An input keypad 116
inputs information to monitor processor 112, and monitor
processor 112 sends information to an output display 114.
Object unit 100 communicates with monitor unit 108
through radio transmitter 106 and radio receiver 110.

The detection of centrifugal force is essentially the detection of spin. For example, baseballs and footballs spin when
tossed and generally do not spin otherwise. Therefore, if
monitor unit 108 is programmed by the user with the
distance of a ball's toss, which can be entered by the user
with keypad 116, monitor unit 108 can calculate the ball's
speed if the ball transmits to monitor unit 108 its spin time,
since spin time equals time of flight.

The g-forces experienced internal to a spinning ball are
proportional to the square of the ball's spin rate. Since the
acceleration sensors of accelerometer network 102 and
electronic processor circuit 104 are able to measure the
magnitude of the centrifugal forces, the spin rate can be
deduced. Transmitting the g-force or spin rate information
from radio transmitter 106 to radio receiver 110 of monitor
unit 108, along with the spin time datum (the amount of time
that the ball was spinning) allows monitor processor 112 to
calculate not only the speed and spin rate of a toss, but also
the calculated potential for the ball to 'curve'. The results are
shown in display 114.

If the axis of rotation of the ball is perfectly perpendicular
to the ground plane, the total 'curve potential' can be
realized. However, if the axis is parallel to the ground plane,
the ball might not have any lateral deflection at all. In fact,
with the proper orientation, the spinning may cause the ball
to resist or accentuate the natural curve of a ball downward
toward the ground due to gravity.

Monitor unit 108 can use the distance, speed, and spin rate
information to estimate the potential for lateral deflection. In
certain embodiments, the monitor may also have barometric
pressure and hygrometer (humidity meter) devices and a
gyroscope, or some other gravity vector detection device. To
more accurately calculate and describe the lateral deflection
(which may be expressed in inches or centimeters of curve
of the ball away from a straight line trajectory) monitor unit
108 incorporates gravity vector information along with
barometric pressure and humidity information about the
ambient air.

Accelerometer network 102 may contain accelerometers
of one or more of the following types: piezoelectric,
mechanical, micro-machined silicon chip, or any other type
small enough to be embedded, secured, or attached in a
movable object. It may be advantageous to use two different
types of sensors. For example, in a baseball a mechanical
sensor might be used to detect 'use' of the ball to activate
electronic processor circuit 104, whereas micro-machined
silicon sensors might be used to detect spin events associated with the tosses to be measured. In this example, the
mechanical switch provides the advantage of requiring zero
power for its operation. The silicon sensors, unlike a
mechanical on/off switch sensor, can provide an output
proportional to the acceleration force.

Monitor unit 108 can be used to provide information other
than distance, velocity, spin rate, or curve. It can provide
time of flight, or elapsed time, and trajectory height information as well. In fact, these two trajectory statistics are
independent of the horizontal distance traversed by the
movable object containing object unit 100. Time of flight is
simply obtained by measuring the amount of time between
the start and end of spin of the movable object. This raw data
is used in the velocity calculation. Provided that the launch
altitude is equivalent to the landing altitude (or reasonably
so with respect to the trajectory height) the movable object
trajectory's maximum altitude can be calculated by monitor
unit 108 and displayed to the user.

The equation that describes the vertical distance covered
by a falling object is given below:

$$d = (½)at^2$$

where:
d=distance covered by the falling object (in inches)
a=acceleration due to gravity (32.2 feet/sec$^2$)
t=flight time—from the moment the object was released
to the moment it hits the ground (in seconds)

It is also generally true that the fall time of an object that
is catapulted is equal to its rise time. That is, the time it takes
for a football to reach its maximum vertical height in a punt
is equal to the time it takes for the ball to fall back to the
ground, provided that the ball is received on the same
stationary plane from which it was kicked, roughly about
four feet off the ground. Hence, the vertical height h of a
punted football with total air time $t_a$ is given by the following equation:

$$h = (⅛)at_a^2$$

Key to this invention are the following concepts:

1. arranging the sensor devices of accelerometer network
102 in a specific pattern within a movable object, such
as a baseball, to sense the movable object's spin
motion;
2. applying specific methods to the output of accelerometer network 102 through the use of electronic processor circuit 104 to determine whether to transmit information to external monitor unit 108 and what
information should be transmitted;

3. transmitting specific information about sensor measurements to external monitor unit 108;
4. having monitor unit 108 use the data received via radio transmissions and data input by the user via keypad 116 to derive new trajectory statistics; and
5. showing the raw and calculated trajectory statistics on display 114.

The sensors making up accelerometer network 102 are arranged to detect spinning of the movable object about one or more internal axes. Object unit 100 signals the commencement of spinning and the cessation of spinning, or it signals the measured elapsed time between these two events to radio receiver 110 of monitor unit 108 via radio transmitter 106. Monitor unit 108 assumes that the spinning of the movable object containing object unit 100 occurs only as the result of being in flight and calculates the speed of the movable object by dividing the distance covered by the movable object by the time of flight. The distance covered by the movable object may be entered into monitor unit 108 via keypad 116 by the user.

Some types of sensors of accelerometer network 102 would be capable of measuring the centrifugal force generated by the movable object's spin. The peak or average centrifugal g-force experienced by these sensors while the ball is spinning may also be transmitted to monitor unit 108. Monitor unit 108, knowing the distance of the sensors from the axes of rotation, can calculate the spin rate R of the movable object using the following equation:

$$R = \sqrt{g/1.226r}$$

where:
R=revolutions/second
g=centrifugal g-force, 1 g=32.2 ft/sec$^2$
r=radial distance from axis of rotation to sensor in feet The electronic processor circuit or the monitor processor may apply an adjustment factor to the measured elapsed time based upon the application. For example, in a baseball pitch, the point at which a spin event is detected in the windup and release of the baseball will affect the speed calculation. Simultaneous testing of the device with a Doppler radar system can be used to determine whether an adjustment for time, either adding or subtracting a few milliseconds, is necessary for the device to accurately calculate and display the speed of the baseball.

Also, adjustment factors may be applied to the average speed to display an estimate of the peak velocity of a ball (the initial velocity when the ball left the pitcher's hand), or the minimum velocity (the final velocity when the ball is caught). A tossed ball loses speed as it travels due to air resistance. The amount of speed loss varies for different average speeds. For a pitch having an average speed of ninety miles per hour, a good approximation is one mile per hour loss in speed per seven feet traveled. Hence, the peak and minimum velocities of a pitched baseball can be estimated by the following equations:

Peak Velocity $$V_p = V_a + 0.5(d/l)$$

Minimum Velocity $$V_m = V_a - 0.5(d/l)$$

where:

$V_p$=peak velocity in miles per hour
$V_m$=minimum velocity in miles per hour
$V_a$=average velocity in miles per hour
d=distance covered in flight in feet
l=velocity loss due to air resistance in feet/miles per hour The value of l depends upon the type of ball and the average speed of a pitch. The monitor processor will select a value of l using a lookup table or a mathematical calculation. For a baseball thrown at an average speed of 90 MPH over a distance of 60 feet, l is 7 and $V_m$ is calculated as shown below:

$$V_m = 90 - 0.5(60/7) = 86 \text{ MPH}$$

This calculation yields a speed that better matches the reading of an accurate Doppler radar that displays the velocity of a pitch as it crosses home plate. For whatever speed is calculated—average, peak, or minimum—the monitor updates the speed and flight time and spin rate displays only if the calculated speed is of a reasonable value for the given application. In the baseball pitching application, the display is updated if the calculated speed is between 20 and 100 MPH, for example.

A solid core is found at the heart of each regulation baseball or softball. Also, a hockey puck consists of a solid hard rubber material. Ideally, object unit 100 will be embedded in a core material that matches the weight characteristics of the regulation core. An epoxy resin might be used. It is important to position and orient accelerometer network 102 in the center of a ball.

The antenna for radio transmitter 106 should be fully contained within the core also. The final product must be impervious to summer heat, winter cold, and the tremendous g-forces resulting from fast pitches, kicks, hockey slap shots, bats, or hits. Another challenge is to maintain the symmetrical balance of a ball or puck. Embedding object unit 100 within a deformable movable object such as a football or soccer ball is more difficult unless the ball has a foam core and is just a facsimile of a real ball. In an air-filled ball the object unit could be suspended in the center using strings or fabric webbing or other suitable means.

When accelerometer network 102 detects a spin event, it stimulates radio transmitter 106 to transmit signals conveying the duration of the spin event to monitor unit 108, which is external to object unit 100. Monitor processor 112 could calculate the speed of a baseball pitch using two pieces of information: 1) the duration of the spin event, and 2) the distance between the pitcher and the catcher. The distance between the pitcher and the catcher may be provided by the user to monitor processor 112 via manual entry through input keypad 116 or, alternatively, using a remote distance measuring device such as an ultrasonic based measure (not shown in FIG. 1). After each event, monitor unit 108 may display the calculated speed in output display 114.

Figure 2:
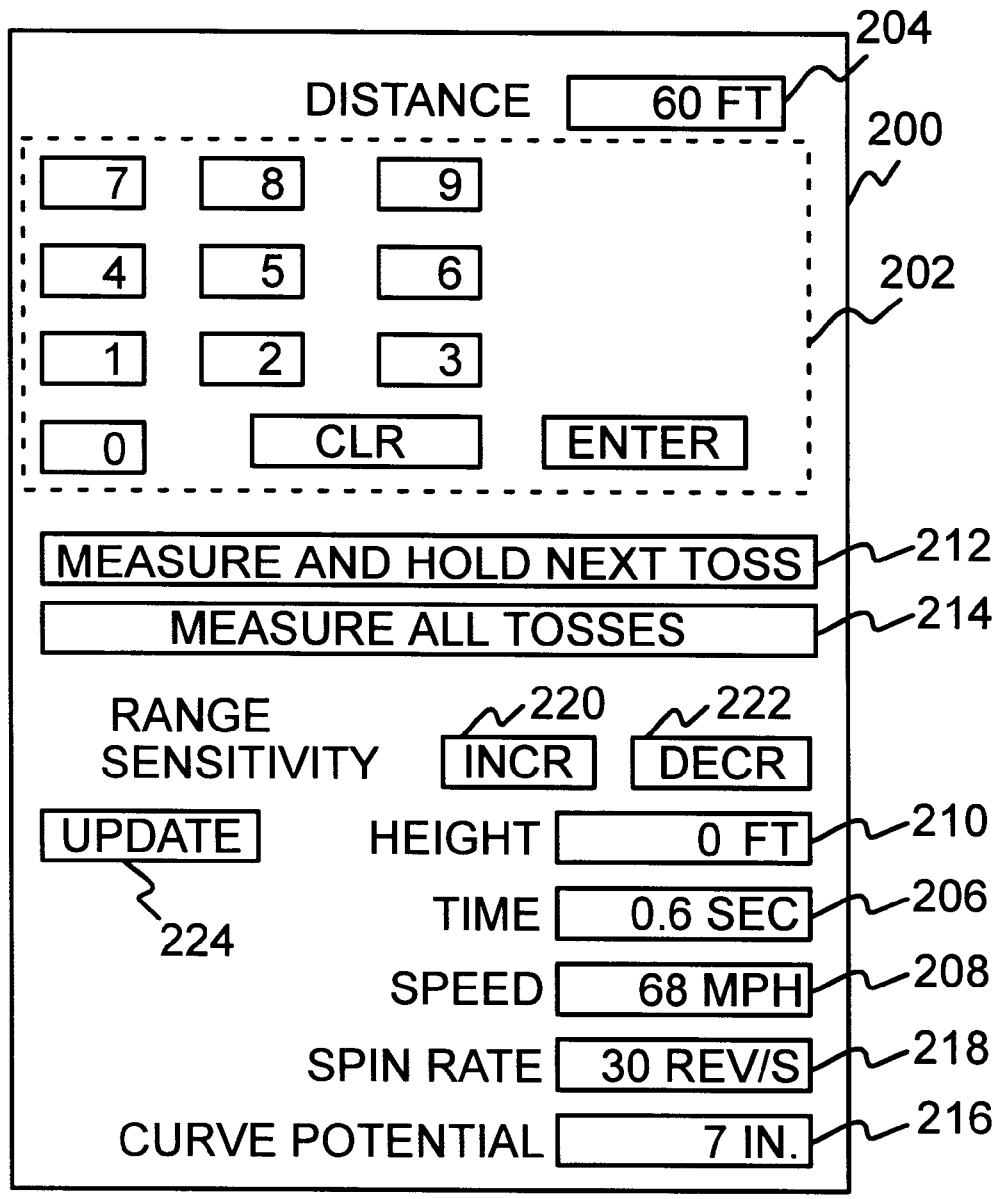
FIG. 2 shows an embodiment of the face of the monitor unit of the present invention.

FIG. 2 shows an embodiment of the face of monitor unit 108 of the present invention. Referring now to FIG. 2, face 200 of monitor unit 108 (FIG. 1) has numeric keypad 202 where the user may input information, such as the distance between a pitcher and a catcher. There are six displays. Distance display 204 shows the distance between two points, such as a pitcher and a catcher, that has been entered through numeric keypad 202. Time display 206 shows the time of flight of a movable object as calculated by monitor processor 112 (FIG. 1). Speed display 208 shows the speed of a movable object as calculated by monitor processor 112. Height display 210 shows the height of a movable object, such as a batted baseball or punted football, as calculated by monitor processor 112. Spin rate display 218 shows the revolutions per second of a movable object, such as a pitched baseball or thrown football, as calculated by monitor processor 112. Curve display 216 shows the potential lateral deflection in inches of a movable object, such as a pitched baseball, as calculated by monitor processor 112.

Measure and hold next toss button 212 is used to select the measure and hold next toss capability. To measure the speed of a pitched baseball using this capability, the pitcher or catcher would perform the following operations:

1. Throw a warm-up pitch to activate the embedded electronics (assuming that a motion based activation system is used).
2. Enter the distance in feet between the pitcher and catcher using numeric keypad 202.
3. Deliver the ball to the pitcher.
4. Press measure and hold next toss button 212.
5. Pitch and catch the ball.
6. Look at the displayed speed. There is no need to avoid spinning the ball in this mode as further spin events will be ignored and the speed for the pitch of interest is captured and held until one of the option buttons is pressed again. This mode allows a pitcher to throw the ball against a wall and have it bounce and roll on the ground, creating additional spin events, and still retain the speed statistic for the pitch.
7. Continue repeating steps 4 through 6 as desired.

In this mode of operation, the elapsed time between the two spin event markers received following depression of measure and hold next toss button 212 is used in the speed calculation. Subsequent spin events will not affect the displayed speed statistic.

Measure all tosses button 214 is used to select the measure all tosses capability. To measure the speed of a pitched baseball using this capability, the pitcher or catcher would perform the following operations:

1. Throw a warm-up pitch to activate the embedded electronics (assuming that a motion based activation system is used).
2. Enter the distance in feet between the pitcher and catcher using numeric keypad 202.
3. Press measure all tosses button 214.
4. Deliver the ball to the pitcher.
5. Pitch and catch the ball.
6. Look at the displayed speed in speed display 208 before spinning the ball again.
7. Continue repeating steps 5 through 6 as desired.

In this mode of operation, monitor processor 112 calculates a new value for display in speed display 208 each time a spin event marker is received from the ball. The speed is calculated simply by dividing the distance value that was entered by the time that has elapsed since the last spin event marker was registered. Therefore, if after the pitch is caught, the ball is dropped by the catcher, the displayed speed will be in error if the dropping of the ball resulted in a valid spin event.

Although most pitching rubbers are placed a regulation distance from home plate, sometimes the distance must actually be measured prior to use of the invention to assure accurate results. In one embodiment of the invention, this measurement can be facilitated by placing an ultrasonic wave transmitter/receiver within monitor unit 108 that communicates with monitor processor 112, and locating the monitor unit at the measuring start or end point of interest.

Whenever the measure button (not shown in FIG. 2) is pressed on the monitor unit, the distance measured from the start point to the end point will appear in distance display 204 and will subsequently be used in the speed calculations. For example, the catcher may have monitor unit 108 with the ultrasonic wave transmitter. The catcher would aim the ultrasonic wave transmitter at the pitcher, press the measure button, and the distance between the catcher and pitcher will appear in distance display 204. Alternatively, a separate ultrasonic wave transmitter with its own readout could be used, and the distance manually entered via numeric keypad 202.

The sensitivity of the monitor's radio frequency receiver can be adjusted by pressing range sensitivity increase button 220 or range sensitivity decrease button 222. As the sensitivity is increased or decreased, the monitor recognizes radio signals from transmitting baseballs within an increased or decreased range of proximity accordingly.

When the radio transmission scheme utilized is one in which flight data is sent only at the end of flight (as described in FIGS. 11 through 14) and the monitor is placed close to ballplayer A (who is playing catch with ballplayer B), the decreased sensitivity setting can be used to restrict the monitor to recognizing transmissions from the ball when it is caught by ballplayer A only. In this way only ballplayer B's toss statistics are calculated and displayed on the monitor. This scheme can also be used with the other radio transmission schemes discussed to reduce the probability of interference from other ball/monitor systems in the vicinity.

For the embodiment of the invention that utilizes a modulated backscatter radio transmission technique, pressing update button 224 initiates a poll of the object unit by the monitor unit to obtain data being held by the object unit about the movable object.

Figure 3:
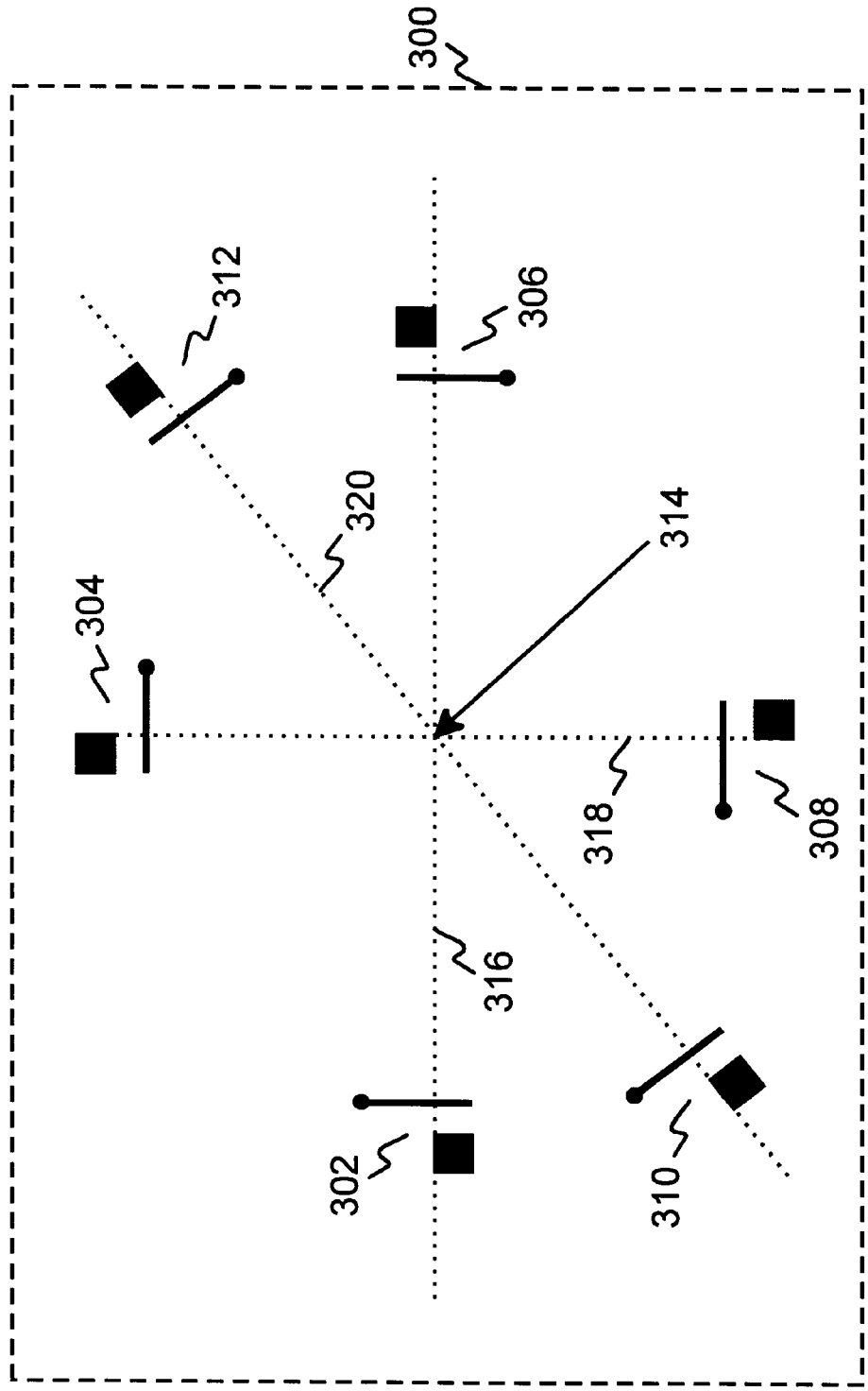
FIG. 3 shows a modified perspective view of an embodiment of an acceleration sensor network of the present invention.

FIG. 3 shows a modified perspective view of an embodiment of an acceleration sensor network. Referring now to FIG. 3, acceleration sensor network 300 is embedded, secured, or attached in the center of a movable object, such as a baseball, and utilizes simple on/off mechanical g-force sensor switches. Acceleration sensor network 300 is designed to detect or measure the spinning of the movable object about one or more internal axes that run through center of movable object 314. Each mechanical g-force sensor switch, of which there are several suitable common types, is activated whenever the switch experiences a g-force in excess of its threshold value in its direction of sensitivity. Mechanical g-force sensor switches 302 and 306 lie on a first axis 316, are equidistant from center of movable object 314, and their directions of sensitivity are opposite of each other. The same is true for mechanical g-force sensor switches 304 and 308 which lie on a second axis 318, perpendicular to first axis 316, and equidistant from center of movable object 314. Though it is possible to sense rotation of the ball about any axis with only mechanical g-force sensor switches 302 and 306 on first axis 316 and mechanical g-force sensor switches 304 and 308 on second axis 318, mechanical g-force sensor switches 310 and 312, located on third axis 320 and equidistant from center of movable object 314, may be added for additional sensitivity. Third axis 320 also passes through center of movable object 314 and is perpendicular to both first axis 316 and second axis 318.

The orientation of each sensor's direction of sensitivity is important. The orientation of sensitivity for each pair of sensors that lie on the same axis must be opposite from each other. Electronic processor circuit 104 (FIG. 1) determines that the movable object is spinning if:

1. both mechanical g-force sensor switches 302 and 306 were on due to centrifugal force, or 2. both mechanical g-force sensor switches 304 and 308 were on due to centrifugal force, or 3. both mechanical g-force sensor switches 310 and 312 were on due to centrifugal force, or 4. any combination of the above three conditions are true.

Acceleration events occurring due to translational movement of the movable object, such as that occurring in normal handling or bouncing, will be easily filtered out since for such events only one of the two opposing sensors along an axis will turn on.

Figure 4:
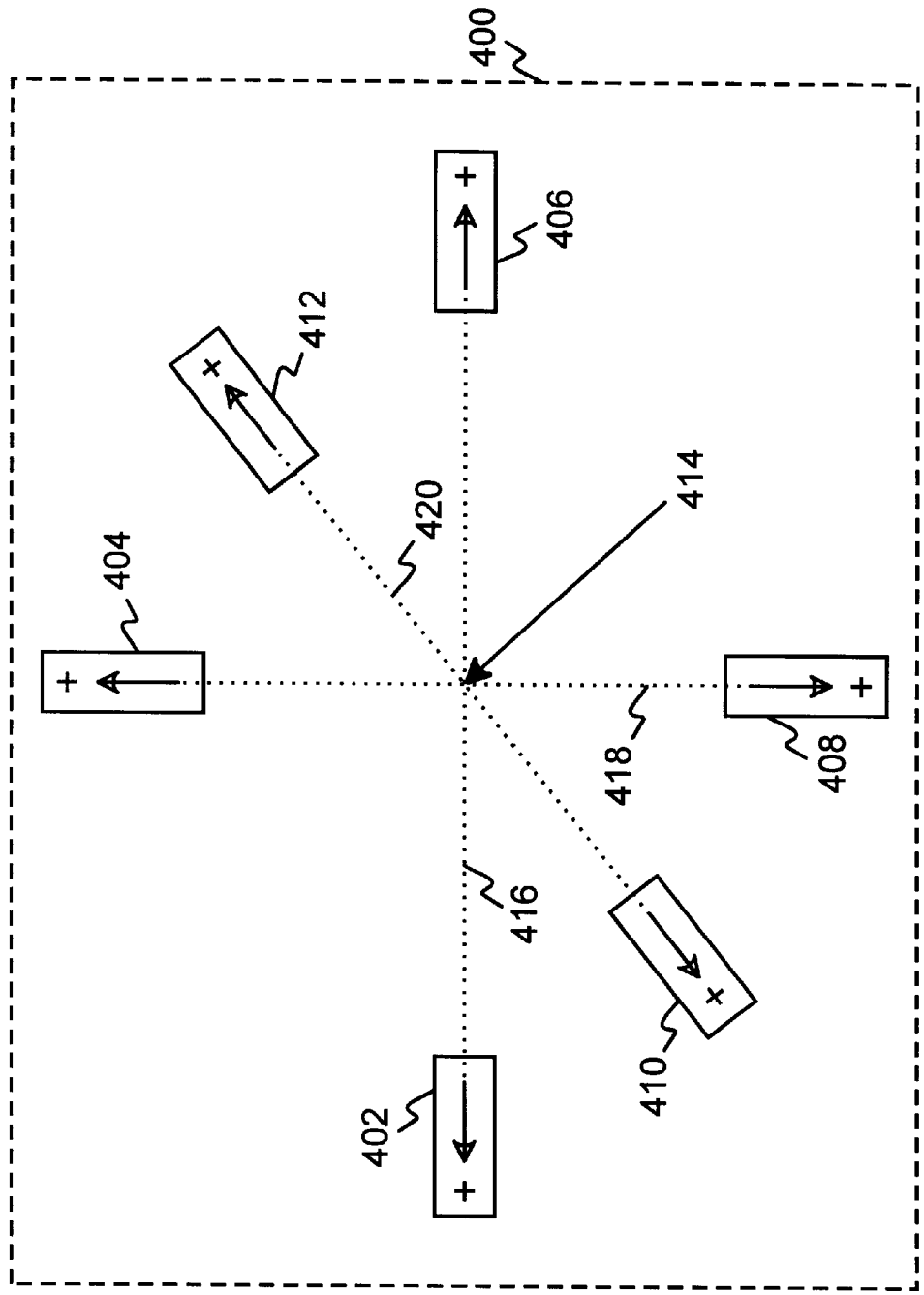
FIG. 4 shows a modified perspective view of another embodiment of an acceleration sensor network of the present invention.

FIG. 4 shows a modified perspective view of another embodiment of an acceleration sensor network. Referring now to FIG. 4, acceleration sensor network 400 is embedded, secured, or attached in the center of a movable object, such as a baseball, and utilizes g-force proportional output sensor switches that output a g-force proportional signal. The arrangement of g-force proportional output sensor switches would be the same as for the mechanical g-force sensor switches of FIG. 3.

Acceleration sensor network 400 is designed to detect or measure the spinning of the movable object about one or more internal axes that run through center of movable object 414. Each g-force proportional output sensor switch is activated whenever the switch experiences a g-force in excess of its threshold value in its direction of sensitivity.

G-force proportional output sensor switches 402 and 406 lie on a first axis 416, are equidistant from center of movable object 414, and their directions of sensitivity are opposite of each other. The same is true for g-force proportional output sensor switches 404 and 408 which lie on a second axis 418, perpendicular to first axis 416, and equidistant from center of movable object 414. Though it is possible to sense rotation of the ball about any axis with only g-force proportional output sensor switches 402 and 406 on first axis 416 and g-force proportional output sensor switches 404 and 408 on second axis 418, g-force proportional output sensor switches 410 and 412, located on third axis 420 and equidistant from center of movable object 414, may be added for additional sensitivity. Third axis 420 also passes through center of movable object 414 and is perpendicular to both first axis 416 and second axis 418.

It is important that the positive direction of sensitivity (the voltage output is positive for centrifugal force in this direction) for each sensor along the same axis be arranged in the opposite direction as shown in FIG. 4. Electronic processor circuit 104 determines that the movable object is spinning if:

1. both g-force proportional output sensor switches 402 and 406 give an indication of force in their respective positive directions, or 2. both g-force proportional output sensor switches 404 and 408 give an indication of force in their respective positive directions, or 3. both g-force proportional output sensor switches 410 and 412 give an indication of force in their respective positive directions, or 4. any combination of the above three conditions are true.

Again, acceleration events occurring due to translational movement of the movable object, such as that occurring in normal handling or bouncing, will be easily filtered out since for such events only one of the two opposing sensors will give a positive indication, and the other will give either no indication or a negative indication, depending on the type of sensor used.

Figure 5:
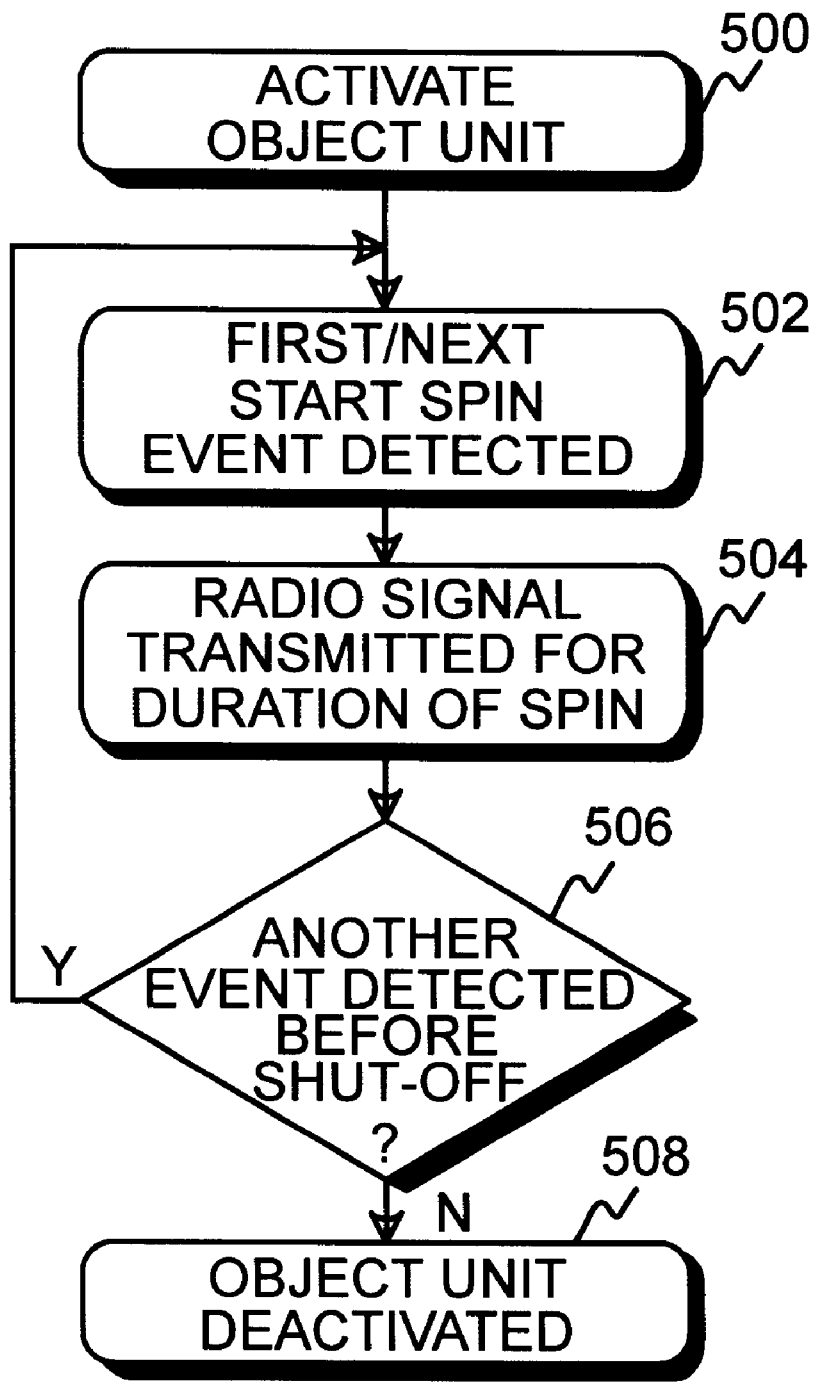
FIG. 5 shows a block diagram of a non-modulated radio transmission of spin duration by the object unit.

FIG. 5 shows a block diagram of an embodiment of the invention where object unit 100 (FIG. 1) transmits a non-modulated radio signal whenever spin is detected for the duration of the spin event. Spin is detected by utilizing either of the acceleration networks described in FIG. 3 or FIG. 4.

Referring now to FIG. 5, in block 500 object unit 100 (FIG. 1) is activated. In block 502 a first or subsequent spin event is detected by accelerometer network 102 (FIG. 1). In block 504 a non-modulated radio signal is transmitted continuously for the duration of the spin event. In block 506, if another spin event is detected before the predetermined shut-off time (typically one minute), then control returns to block 502. If not, control passes to block 508 where object unit 100 is deactivated through its shut-off circuitry.

Figure 6:
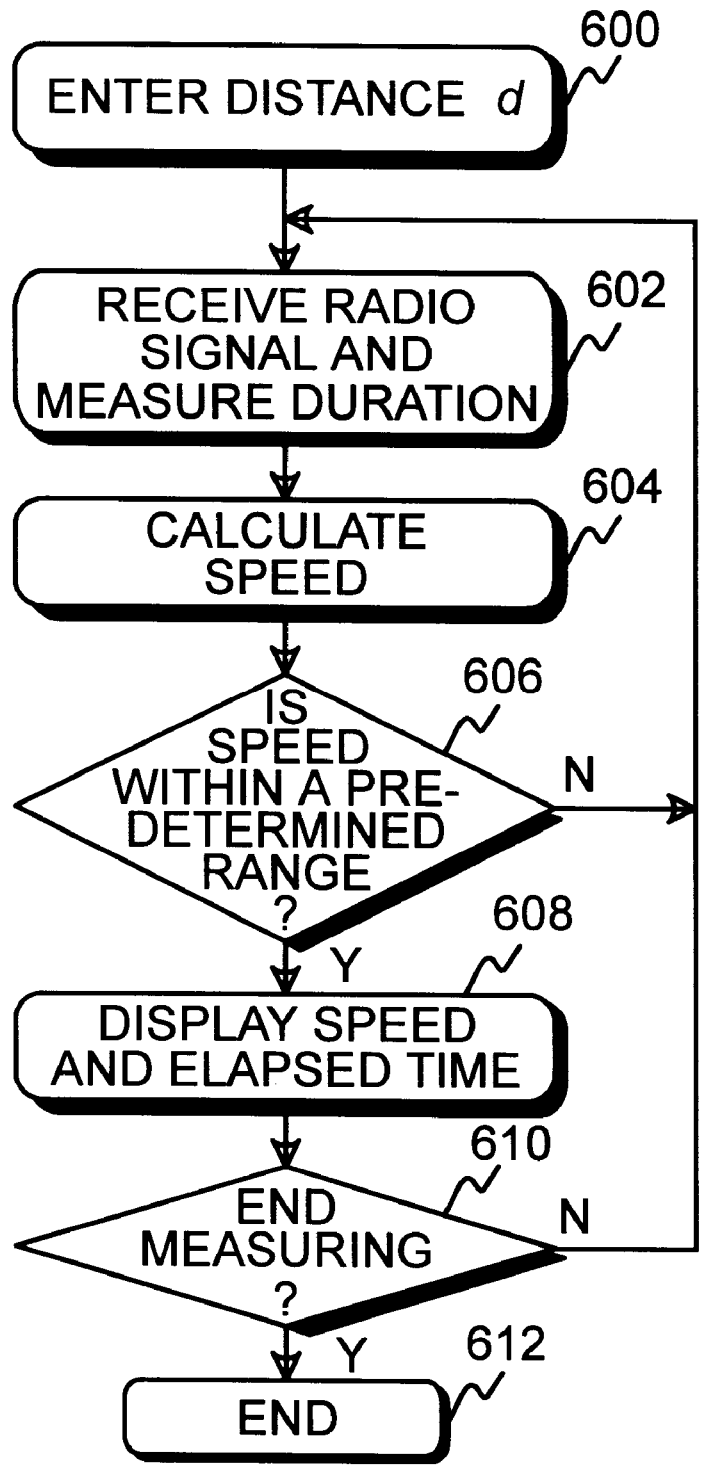
FIG. 6 shows a block diagram of a non-modulated radio transmission of spin duration received by the monitor unit.

FIG. 6 shows a block diagram of an embodiment of the invention where monitor unit 108 (FIG. 1) receives a non-modulated radio signal from object unit 100 of FIG. 5 whenever spin is detected for the duration of the spin.

Referring now to FIG. 6, in block 600 the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In block 602 radio receiver 110 (FIG. 1), which is tuned to the same frequency as radio transmitter 106 (FIG. 1), receives the radio signal sent from radio transmitter 106 from FIG. 5 and measures the duration of the received signal to determine the time of flight. Interference between nearby units of the invention under simultaneous use can be avoided by producing units of the invention that use several different frequencies and avoiding the use of objects with the same frequency in close proximity.

In block 604 the distance d from block 400 is divided by the time of flight from block 402 to determine the speed of the object containing object unit 100 (FIG. 1). Monitor unit 108 may be programmed to calculate peak, minimum, or average speed. Block 606 checks to see of the speed falls within a predetermined speed range for the particular application. If not, then control returns to block 602 to await the next radio signal. If yes, control passes to block 608 where the speed and time of flight are shown in speed display 208 (FIG. 2) and time display 206 (FIG. 2). Trajectory height may also be calculated and displayed in height display 210 (FIG. 2) if the event being measured is a football punt, batted baseball, or golf shot. Control then passes to block 610 to determine if measuring of more spin events is to end. If not, control returns to block 602 to receive more signals. If yes, block 612 ends the operation of the invention.

Figure 7:
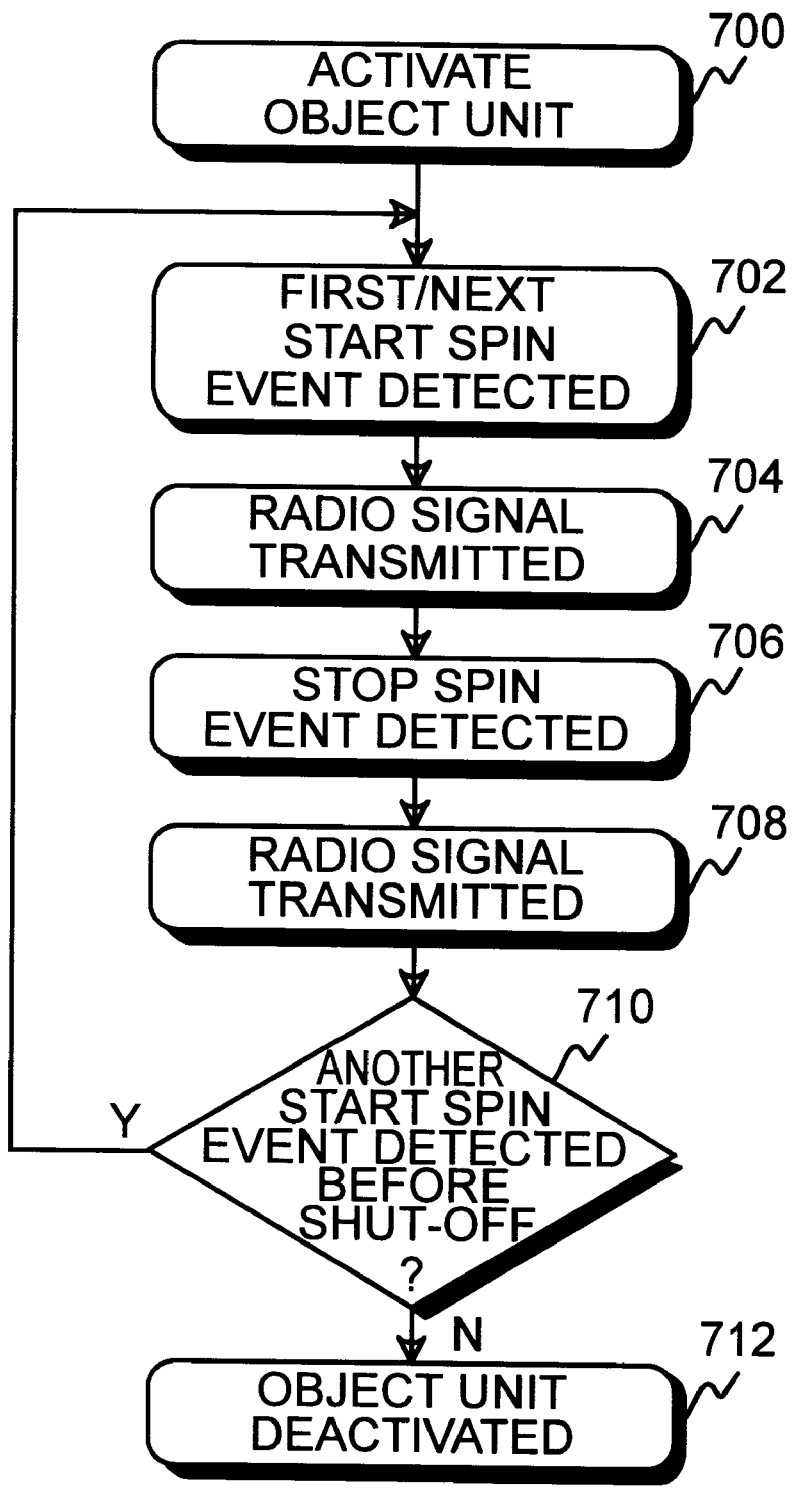
FIG. 7 shows a block diagram of a non-modulated radio transmission at the start and end of spin by the object unit.

FIG. 7 shows a block diagram of an embodiment of the invention where object unit 100 (FIG. 1) transmits a non-modulated, fixed duration, radio signal spin event marker whenever the start of spin is detected and when the cessation of spin is detected. Spin is detected by utilizing either of the acceleration networks described in FIG. 3 or FIG. 4.

Referring now to FIG. 7, in block 700 object unit 100 (FIG. 1) is activated. In block 702 a first or subsequent start spin event is detected by accelerometer network 102 (FIG. 1). In block 704 a non-modulated radio signal of a fixed duration is transmitted as a result of the start spin event. In block 706, accelerometer network 102 detects the cessation of spinning, a stop spin event. In block 708 a non-modulated radio signal of a fixed duration is transmitted as a result of the stop spin event. In block 710, if another start spin event is detected before the predetermined shut-off time (typically one minute), then control returns to block 702. If not, control passes to block 712 where object unit 100 is deactivated through its shut-off circuitry.

Figure 8:
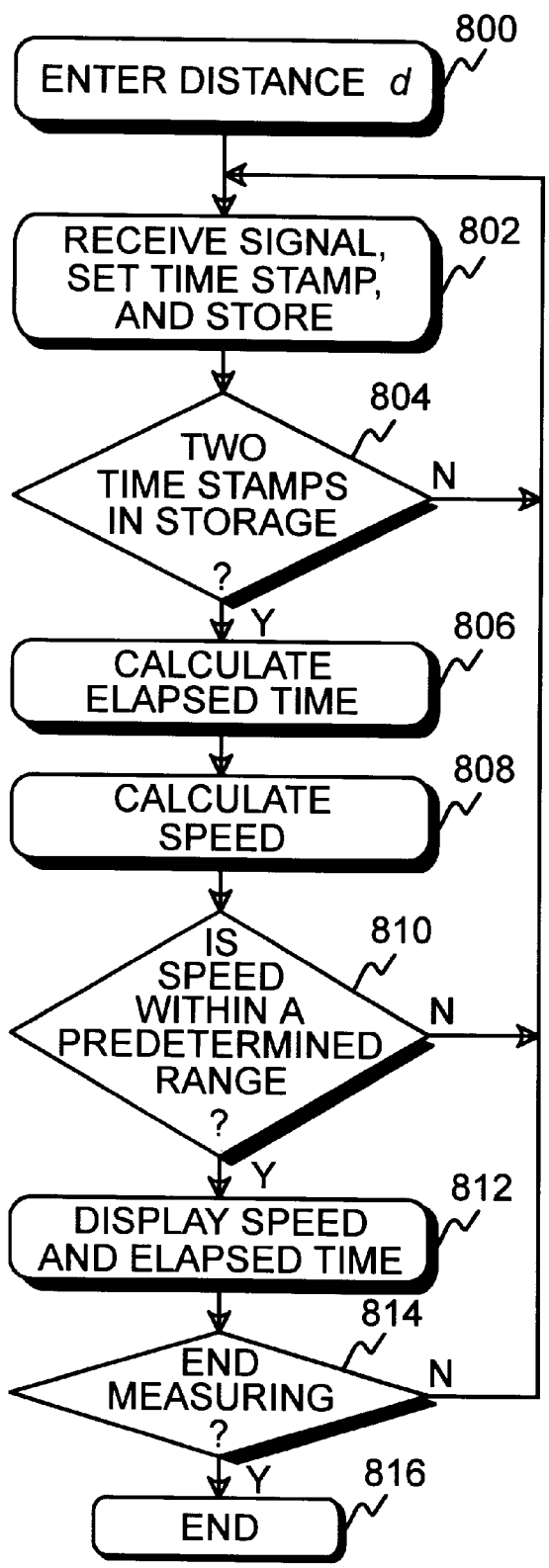
FIG. 8 shows a block diagram of a non-modulated radio transmission at the start and end of spin received by the monitor unit.

FIG. 8 shows a block diagram of an embodiment of the invention where monitor unit 108 (FIG. 1) receives non-modulated, fixed duration, radio signal event markers from object unit 100 of FIG. 7 at the start of a spin event and at the end of a spin event.

Referring now to FIG. 8, in block 800 the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In block 802 radio receiver 110 (FIG. 1), which is tuned to the same frequency as radio transmitter 106 (FIG. 1), receives from radio transmitter 106 a radio signal spin event marker from FIG. 7, and a time stamp is set and stored in a first position in monitor processor 112. Upon receiving the next radio signal spin event marker from radio transmitter 106, another time stamp is set. The time stamp in the first position in monitor processor 112 is moved to a second position in monitor processor 112, and the new signal's time stamp is stored in the first position. Upon receipt of the next signal, the time stamp in the first position is moved to the second position, overwriting the time stamp that was already there, and the most recent signal's time stamp is stored in the first position. This queuing process is repeated each time a new radio signal spin event marker is received.

In block 804 a check is made to determine if there are two time stamps in storage. If not, control returns to block 802. If two time stamps are in storage, control passes to block 806 which determines the elapsed time of the spin event by subtracting the time stamp stored in the second position from the time stamp stored in the first position to determine the time of flight, or elapsed time, of the object. Then in block 808 the distance d from block 800 is divided by the time of flight from block 806 to determine the speed of the object, either peak, minimum, or average speed. In block 810 a check is made to determine if the speed falls within a predetermined range, such as 20–100 MPH for a baseball pitch. If not, control returns to block 802 to receive the next radio signal spin event marker. If yes, block 812 displays the speed in speed display 208 (FIG. 2) and the time of flight in time display 206 (FIG. 2). Control then passes to block 814 to determine if measuring is to end. If not, control passes to block 802. If yes, block 816 ends the operation of the invention.

Figure 9:
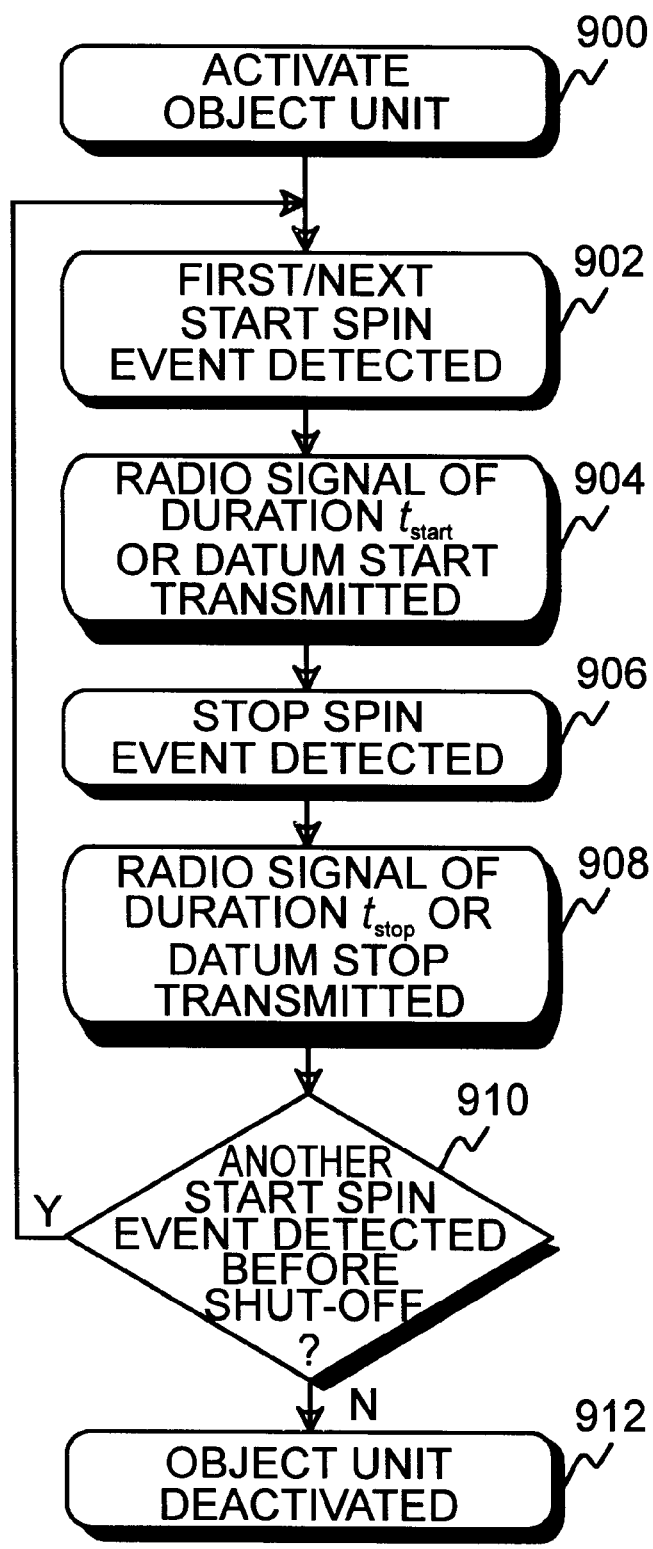
FIG. 9 shows a block diagram of a non-modulated or modulated radio transmission indicating a start spin event or stop spin event by the object unit.

FIG. 9 shows a block diagram of an embodiment of the invention where object unit 100 (FIG. 1) transmits a non-modulated or modulated radio signal indicating a start spin event or stop spin event. Spin is detected by utilizing either of the acceleration networks described in FIG. 3 or FIG. 4.

The modulation strategy addresses the interference issue that arises when multiple numbers of the invention are used in the same vicinity by modulating the data emanating from the object unit with an identification code that is unique to that object unit. The monitor unit packaged with the object unit is factory preset to recognize its mate by way of this identification code as well as the selected frequency. A monitor unit may 'hear' many different signals in an environment crowded with similar object units but will accept only the signals marked with the identification code of its mate. In this strategy, interference is limited to the garbling of transmitted data that occurs if two movable objects transmit event markers simultaneously on the same frequency. A monitor unit that uses an identification code would normally be factory preset to work with a specific movable object that is factory preset to the same identification code. However, a monitor unit designed to allow the user to program the movable object identification code of interest could be used with different movable objects. That is, one monitor unit could simultaneously display trajectory statistics for a multiplicity of object units and the object units could be used simultaneously. However, if spin events for two or more object units occur at the same instant and result in the transmission of the event markers at the same instant at the same frequency, the system will not work. The probability of this occurring is a function of the number of movable objects being monitored on the same frequency, the frequency of spin events per object unit, and the duration of each spin event marker transmission.

Referring now to FIG. 9, the description of blocks 900 through 902 is the same as shown in FIG. 7 in corresponding blocks 700 through 702.

In block 904, either a non-modulated radio signal of duration $t_{start}$ is transmitted as a result of the start spin event, or a modulated radio signal containing a datum indicating that the spin event marker is for a start spin event is sent. In block 906, accelerometer network 102 detects the cessation of spinning, a stop spin event. In block 908 a non-modulated radio signal of duration $t_{stop}$ is transmitted as a result of the stop spin event, or a modulated radio signal containing a datum indicating that the spin event marker is for a stop spin event is sent. In block 910, if another start spin event is detected before the predetermined shut-off time (typically one minute), then control returns to block 902. If not, control passes to block 912 where object unit 100 is deactivated through its shut-off circuitry.

Figure 10:
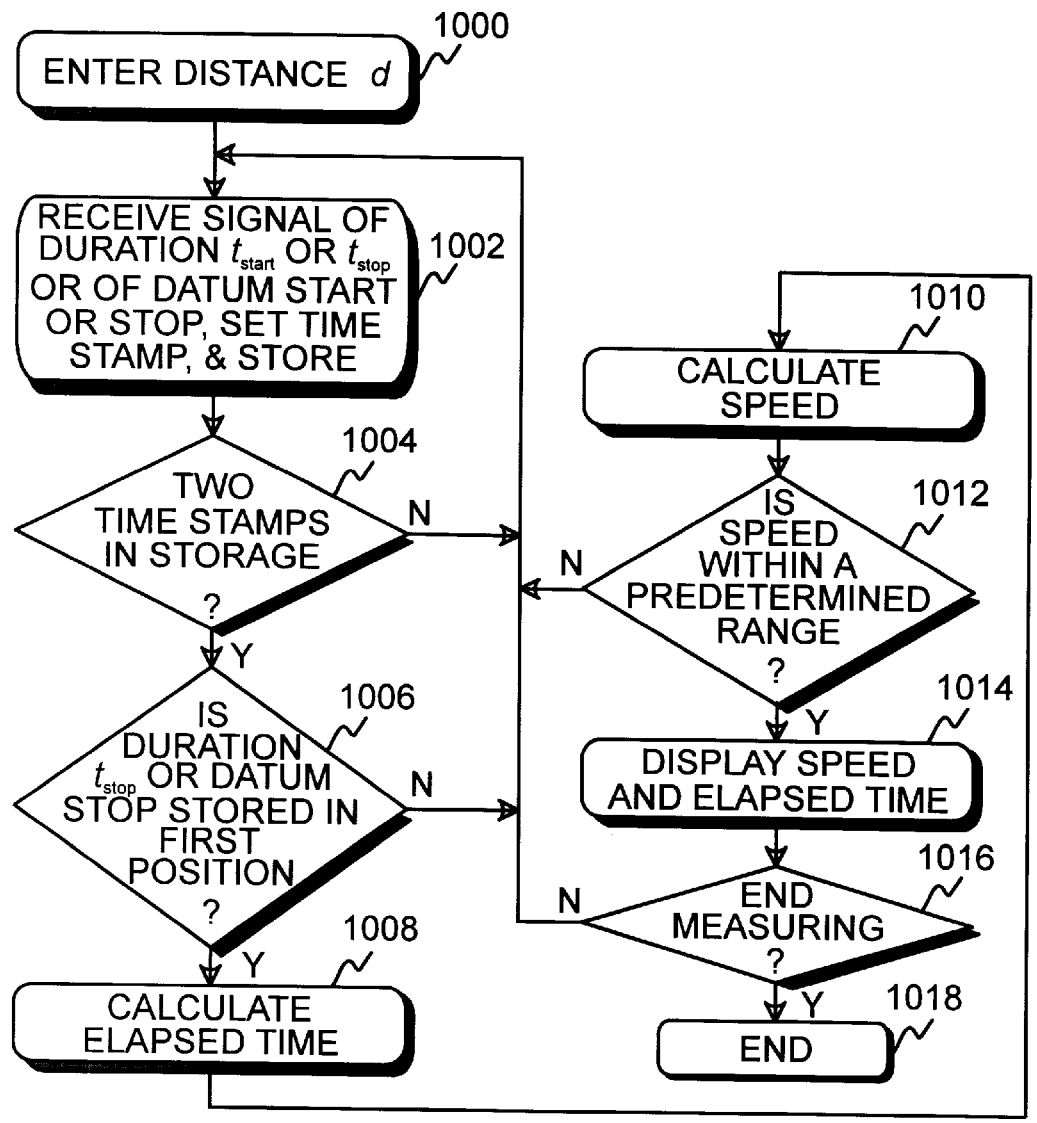
FIG. 10 shows a block diagram of a non-modulated or modulated radio transmission indicating a start spin event or stop spin event received by the monitor unit.

FIG. 10 shows a block diagram of an embodiment of the invention where monitor unit 108 (FIG. 1) receives a non-modulated or modulated radio transmission indicating a start spin event or stop spin event. Referring now to FIG. 10, in block 1000 the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In block 1002 radio receiver 110 (FIG. 1), which is tuned to the same frequency as radio transmitter 106 (FIG. 1), receives from radio transmitter 106 a non-modulated radio signal from FIG. 9 of duration $t_{start}$ or $t_{stop}$, or a modulated radio signal containing a datum indicating that the spin event marker is for a start spin event or a stop spin event. A time stamp is set and stored in a first position in monitor processor 112 (FIG. 1). Upon receiving the next spin event marker from radio transmitter 106, the time stamp in the first position is moved to a second position and the new spin event marker's time stamp is stored in the first position. Upon receipt of the next spin event marker, the time stamp in the first position is moved to the second position, overwriting the time stamp that was already there, and the most recent spin event marker's time stamp is stored in the first position. This queuing process is repeated each time a new spin event marker is received.

In block 1004 a check is made to determine if there are two time stamps in storage. If not, control returns to block 1002. If two time stamps are in storage, control passes to block 1006 which determines if the time stamp stored in the first position is of duration $t_{stop}$, or is a datum of a stop spin event. If not, control returns to block 1002. If yes, then in block 1008 the elapsed time of the spin event is determined by subtracting the time stamp stored in the second position from the time stamp stored in the first position. Then in block 1010 the distance d from block 1000 is divided by the elapsed time from block 1008 to determine the speed of the movable object, either peak, minimum, or average speed. In block 1012 a check is made to determine if the speed falls within a predetermined range, such as 20–100 MPH for a baseball pitch. If not, control returns to block 1002 to receive the next radio signal spin event marker. If yes, block 1014 displays the speed in speed display 208 (FIG. 2) and the time of flight in time display 206 (FIG. 2). Control then passes to block 1016 to determine if measuring is to end. If not, control passes to block 1002. If yes, block 1018 ends the operation of the invention.

Figure 11:
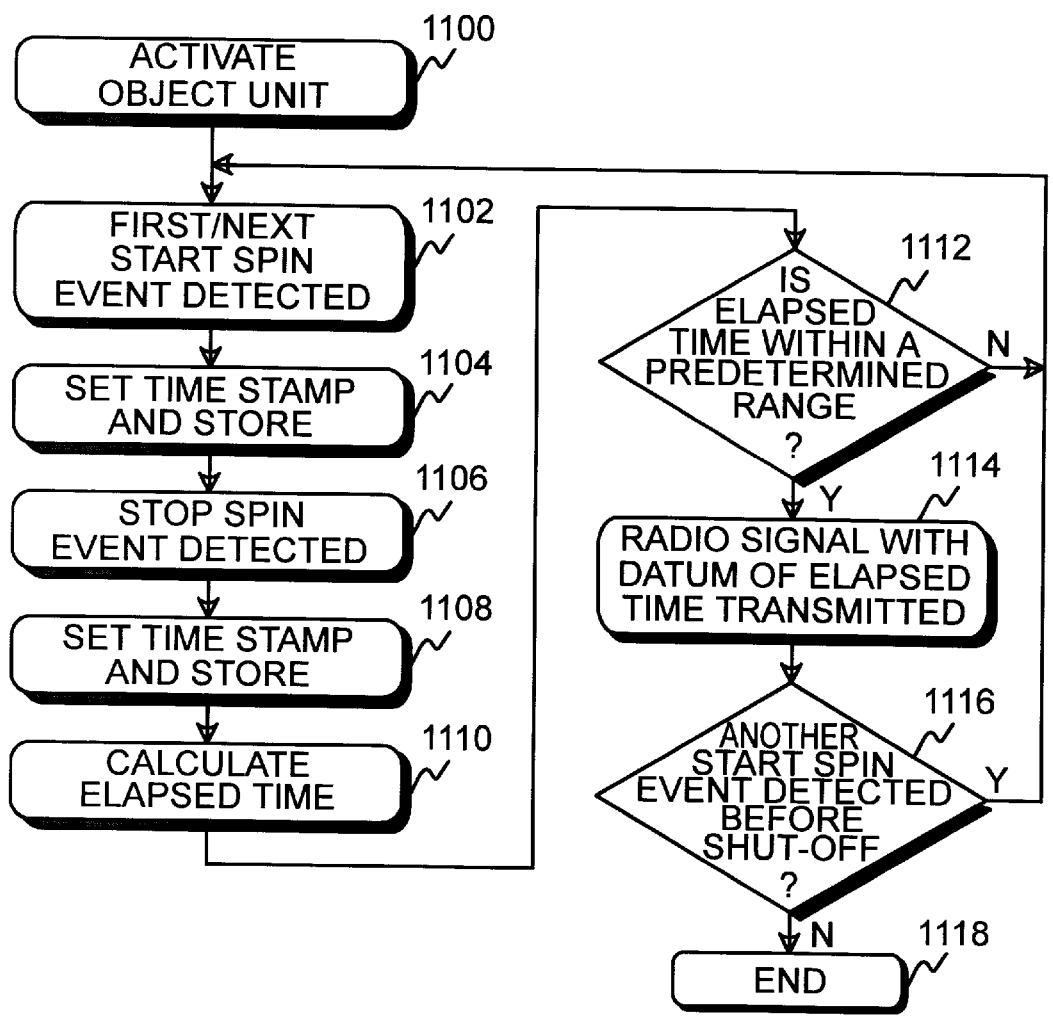
FIG. 11 shows a block diagram of a modulated radio transmission indicating the elapsed time between the start and end of spin by the object unit.

FIG. 11 shows a block diagram of an embodiment of the invention where object unit 100 (FIG. 1) transmits a modulated radio transmission containing a datum indicating the time elapsed between the start and stop of a spin event. Spin is detected by utilizing either of the acceleration networks described in FIG. 3 or FIG. 4.

Referring now to FIG. 11, the description of blocks 1100 through 1102 is the same as shown in FIG. 7 in corresponding blocks 700 through 702. In block 1104, a time stamp is set and stored in a first position in electronic processor circuit 104 (FIG. 1). Upon detecting the next spin event, the time stamp in the first position is moved to a second position and the new spin event's time stamp is stored in the first position. Upon receipt of the next spin event, the time stamp in the first position is moved to the second position, overwriting the time stamp that was already there, and the most recent spin event's time stamp is stored in the first position. This queuing process is repeated each time a new spin event is detected.

In block 1106 a stop spin event is detected. In block 1108 a time stamp is set and stored in electronic processor circuit 104. In block 1110 the elapsed time of the spin event is determined by subtracting the time stamp stored in the second position from the time stamp stored in the first position. Block 1112 then determines if the elapsed time is within a predetermined time range. For the baseball pitching application, a reasonable elapsed time range would be 300 milliseconds to 1500 milliseconds, for example. If not, control returns to block 1102. If yes, then in block 1114 a modulated radio signal containing a datum indicating the elapsed time is transmitted. In block 1116, if another start spin event is detected before the predetermined shut-off time (typically one minute), then control returns to block 1102. If not, control passes to block 1118 where object unit 100 is deactivated through its shut-off circuitry.

Figure 12:
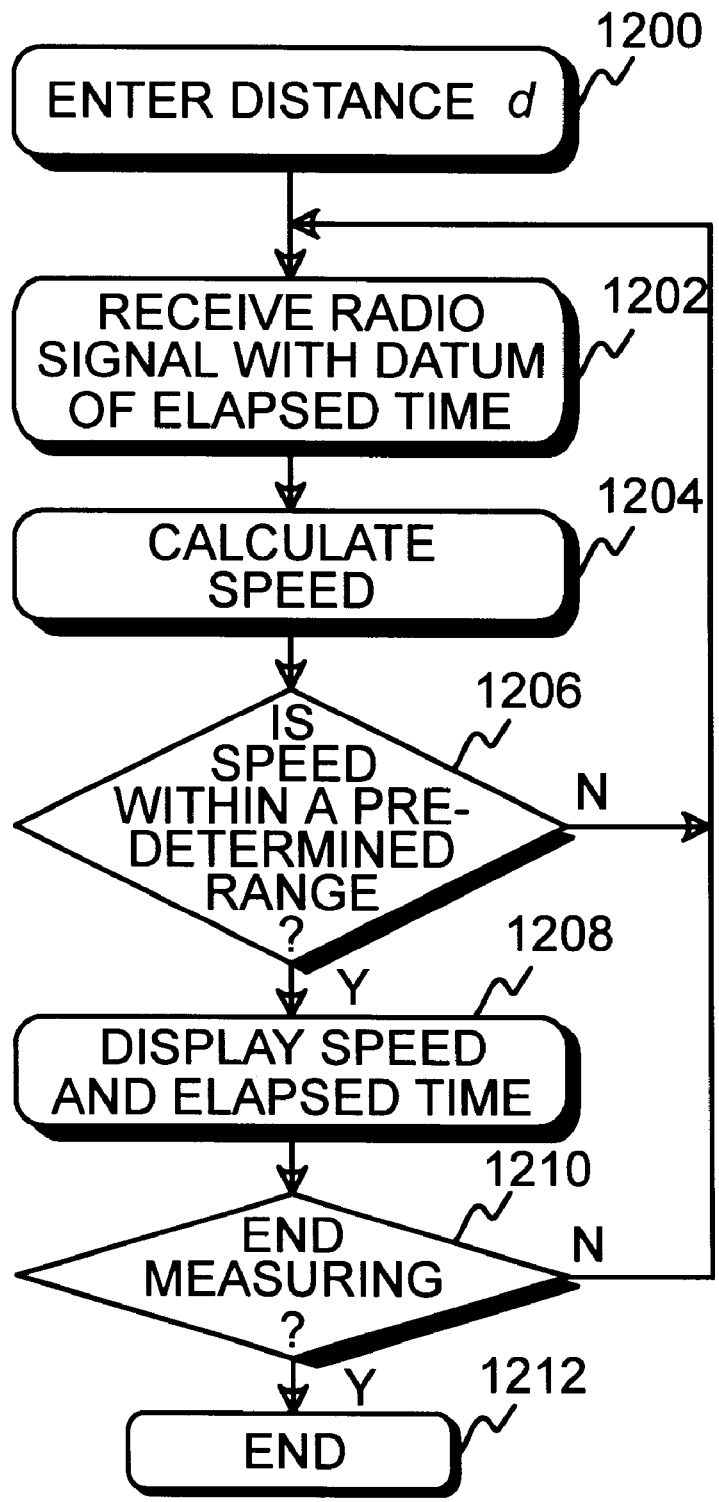
FIG. 12 shows a block diagram of a modulated radio transmission indicating the elapsed time between the start and end of spin received by the monitor unit.

FIG. 12 shows a block diagram of an embodiment of the invention where monitor unit 108 (FIG. 1) receives a modulated radio transmission containing a datum indicating the elapsed time between the start and stop of a spin event.

Referring now to FIG. 12, in block 1200 the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In block 1202 radio receiver 110 (FIG. 1), which is tuned to the same frequency as radio transmitter 106 (FIG. 1), receives from radio transmitter 106 a modulated radio signal from FIG. 11 containing a datum indicating the elapsed time of a spin event. In block 1204 the distance d from block 1200 is divided by the elapsed time from block 1202 to determine the speed of the movable object, either peak, minimum, or average speed. In block 1206 a check is made to determine if the speed falls within a predetermined range, such as 20–100 MPH for a baseball pitch. If not, control returns to block 1202 to receive the next signal. If yes, block 1208 displays the speed in speed display 208 (FIG. 2) and the time of flight in time display 206 (FIG. 2). Control then passes to block 1210 to determine if measuring is to end. If not, control passes to block 1202. If yes, block 1212 ends the operation of the invention.

Figure 13:
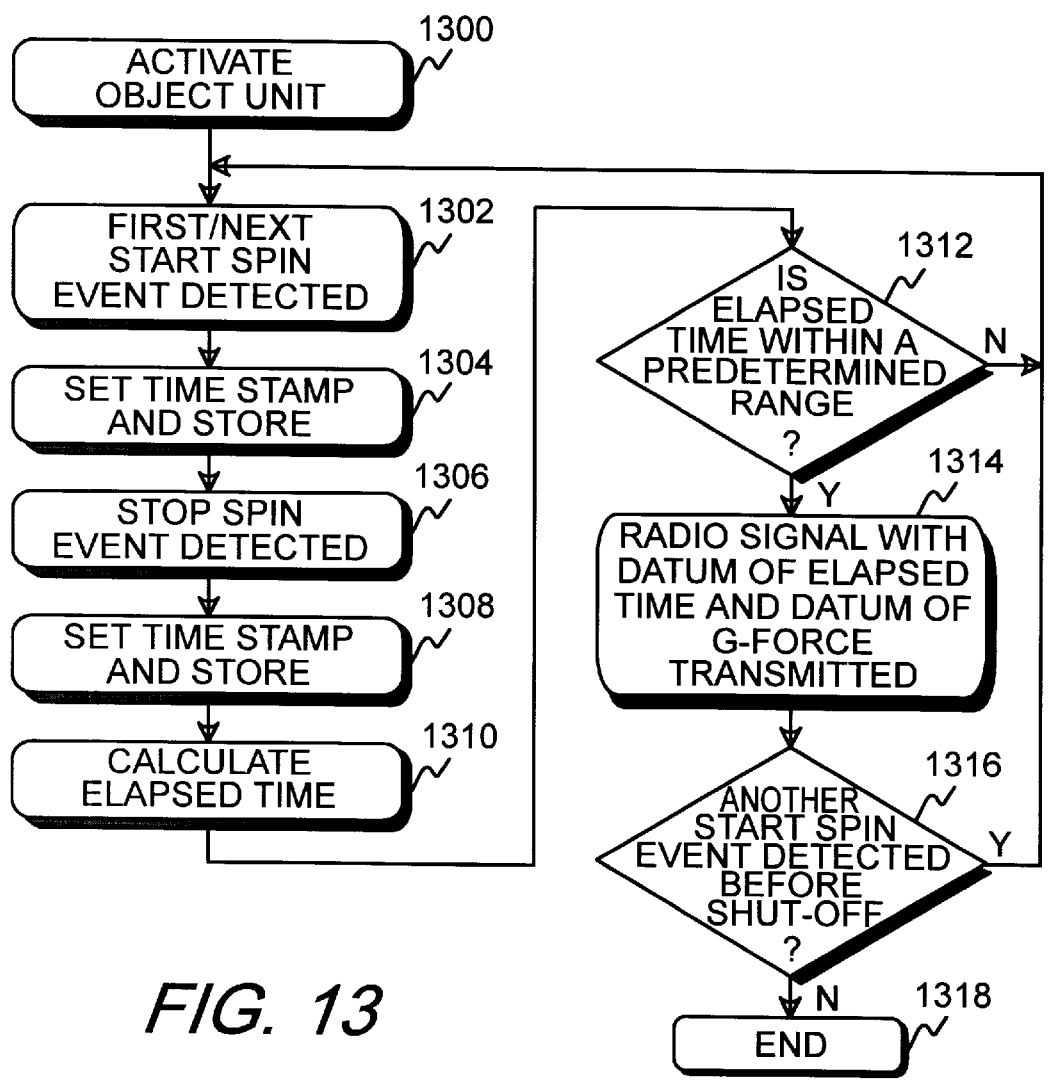
FIG. 13 shows a block diagram of a modulated radio transmission indicating elapsed time between the start and end of spin and g-force level by the object unit.

FIG. 13 shows a block diagram of an embodiment of the invention where object unit 100 (FIG. 1) transmits a modulated radio transmission containing a datum indicating the time elapsed between the start and stop of a spin event and a datum representing the peak or average centrifugal g-force experienced by the acceleration sensors during the spin event. Spin is detected by utilizing the acceleration network described in FIG. 4. Referring now to FIG. 13, the description of blocks 1300 through 1312 is the same as shown in FIG. 11 in corresponding blocks 1100 through 1112.

In block 1314, a modulated radio signal containing a datum indicating the elapsed time and a datum indicating the peak or average centrifugal g-force experienced by accelerometer network 102 (FIG. 1) are transmitted. In block 1316, if another start spin event is detected before the predetermined shut-off time (typically one minute), then control returns to block 1302. If not, control passes to block 1318 where object unit 100 is deactivated through its shut-off circuitry.

Figure 14:
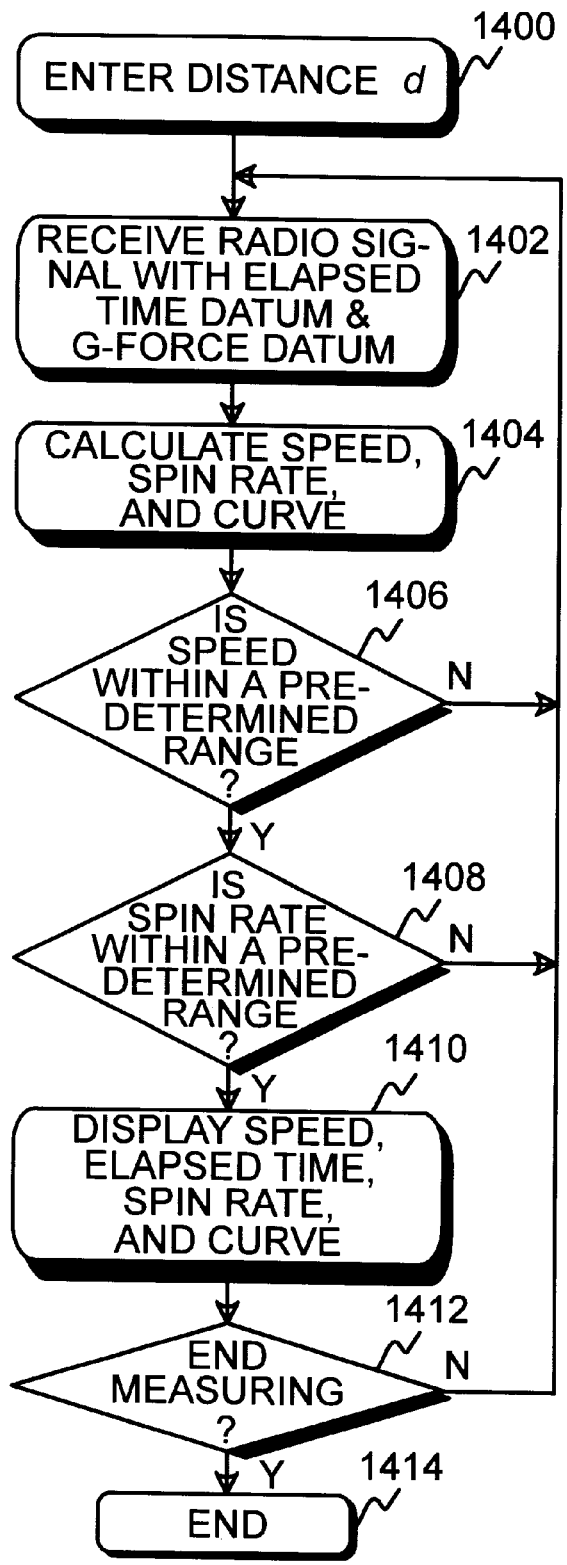
FIG. 14 shows a block diagram of a modulated radio transmission indicating elapsed time between the start and end of spin and g-force level received by the monitor unit.

FIG. 14 shows a block diagram of an embodiment of the invention where monitor unit 108 (FIG. 1) receives from radio transmitter 106 (FIG. 1) a modulated radio transmission containing a datum indicating the time elapsed between the start and stop of a spin event and a datum representing the peak or average centrifugal g-force experienced by the acceleration sensors during the spin event.

Referring now to FIG. 14, in block 1400 the user enters through numeric keypad 202 (FIG. 2) the distance d between two points where characteristics of the movable object containing object unit 100 (FIG. 1) are desired to be measured. For a baseball pitch, the distance between the pitcher and catcher would be entered.

In block 1402 radio receiver 110 (FIG. 1), which is tuned to the same frequency as radio transmitter 106 (FIG. 1), receives from radio transmitter 106 a modulated radio signal from FIG. 13 containing a datum indicating the elapsed time of a spin event and a datum representing the peak or average centrifugal g-force experienced by the acceleration sensors during the spin event. In block 1404 the distance d from block 1200 is divided by the elapsed time from block 1402 to determine the speed of the movable object, either peak, minimum, or average speed, and using the g-force datum, the spin rate of the movable object is calculated. The potential for lateral deflection of a movable object, like a baseball, is also calculated, and is referred to as the curve.

Lateral deflection is deflection of the movable object away from the path that the movable object would traverse in a vacuum. The lateral force that the air turbulence immediately surrounding a thrown spinning ball exerts on the ball is commonly referred to as the Magnus force or the Magnus effect. The potential for lateral deflection can be calculated by using a spinning ball's speed, spin rate, and distance covered statistics.

The lateral deflection that is calculated may not be realized by the pitcher as horizontal 'curve' since this requires an optimal orientation of the ball's axis of rotation with respect to the direction of flight. Hence, the use of the word "potential." For instance, the lateral deflection resulting from top spin causes a ball to sink faster toward the ground. The lateral deflection resulting from back spin causes a ball to resist dropping toward the ground.

The curve displayed on the monitor would be updated only when the speed and spin rate displays are updated, as described above. The curve may be expressed in inches of lateral deflection of the ball at the point at which the ball is caught. According to published sources, the deflection of a baseball due to Magnus force is given by the following equation:

$$d = KL^2 \omega / 2mV$$

where:

- d=deflection in meters
- K=a constant of 7×10⁻⁵ kilograms
- L=the distance of the ball's flight in meters
- ω=rotation rate in radians/second, this is equal to 2 πR where R is the spin rate
- m=mass of the ball in kilograms
- V=translational velocity of the ball in meters/second For a distance L of 59 feet (18 meters), a rotation rate of 1900 rpm (199 radians/second), a baseball of standard 5.125 ounces (0.145 kilograms), and an average translational velocity of 75 MPH (33.5 meters/second), the potential lateral deflection due to the Magnus force is 18.3 inches (0.46 meters). Of course, whether this lateral deflection will be realized depends on the orientation of the ball's axis of rotation with respect to the direction of flight. Using the same statistics except that the speed of the pitch is increased to a 'fast ball' of 90 MPH and the rotation rate is decreased to 1600 rpm, the potential lateral deflection is 12.8 inches (0.33 meters). This equation may be refined as further experimental results are obtained.

The derived potential lateral deflection can be converted into more useful information for the user if the relationship between the vectors describing the baseball's axis of rotation, the direction of flight, and gravity are known by electronic processor circuit 104 (FIG. 1) within the baseball. If the baseball houses a gyroscope, or some other gravity vector detection device, such that the gravity vector is known, the gravity vector can be compared to the axis of rotation vector. The direction of flight vector with respect to the axis of rotation vector can be calculated by using the accelerometers' outputs during the translational acceleration that occurs at the instant before the pitcher releases the ball (or, more precisely, before the pitcher begins spinning the ball). Such a sophisticated baseball/monitor system could display to the user the direction of lateral deflection as well as the magnitude of that deflection. For example, it could tell the user that the pitch had a top spin that caused a fast sinking ball with a Magnus force induced deflection of 12 inches.

Since the amount of lateral deflection can be influenced by the barometric pressure, temperature, and humidity levels, a more accurate estimate of the potential for curve is possible if the monitor unit uses these variables in determining the curve. The monitor unit could prompt the user for this data or could directly measure these variables via built in sensors. The curve is expressed in inches or centimeters of lateral deflection of the ball at the point at which the ball is caught.

In block 1406 a check is made to determine if the speed falls within a predetermined range, such as 20–100 MPH for a baseball pitch. If not, control returns to block 1402 to receive the next signal. If yes, block 1408 determines if the spin rate falls within a predetermined spin rate range. For a baseball application, an acceptable spin rate range might be between 0.5 and 40 revolutions/second. If the spin rate does not fall within the predetermined range, control returns to block 1402. If it does, then block 1410 displays the speed in speed display 208 (FIG. 2), the time of flight in time display 206 (FIG. 2), the spin rate in spin rate display 218 (FIG. 2), and the curve in curve display 216. Control then passes to block 1412 to determine if measuring is to end. If not, control passes to block 1402. If yes, block 1414 ends the operation of the invention.

Figure 15:
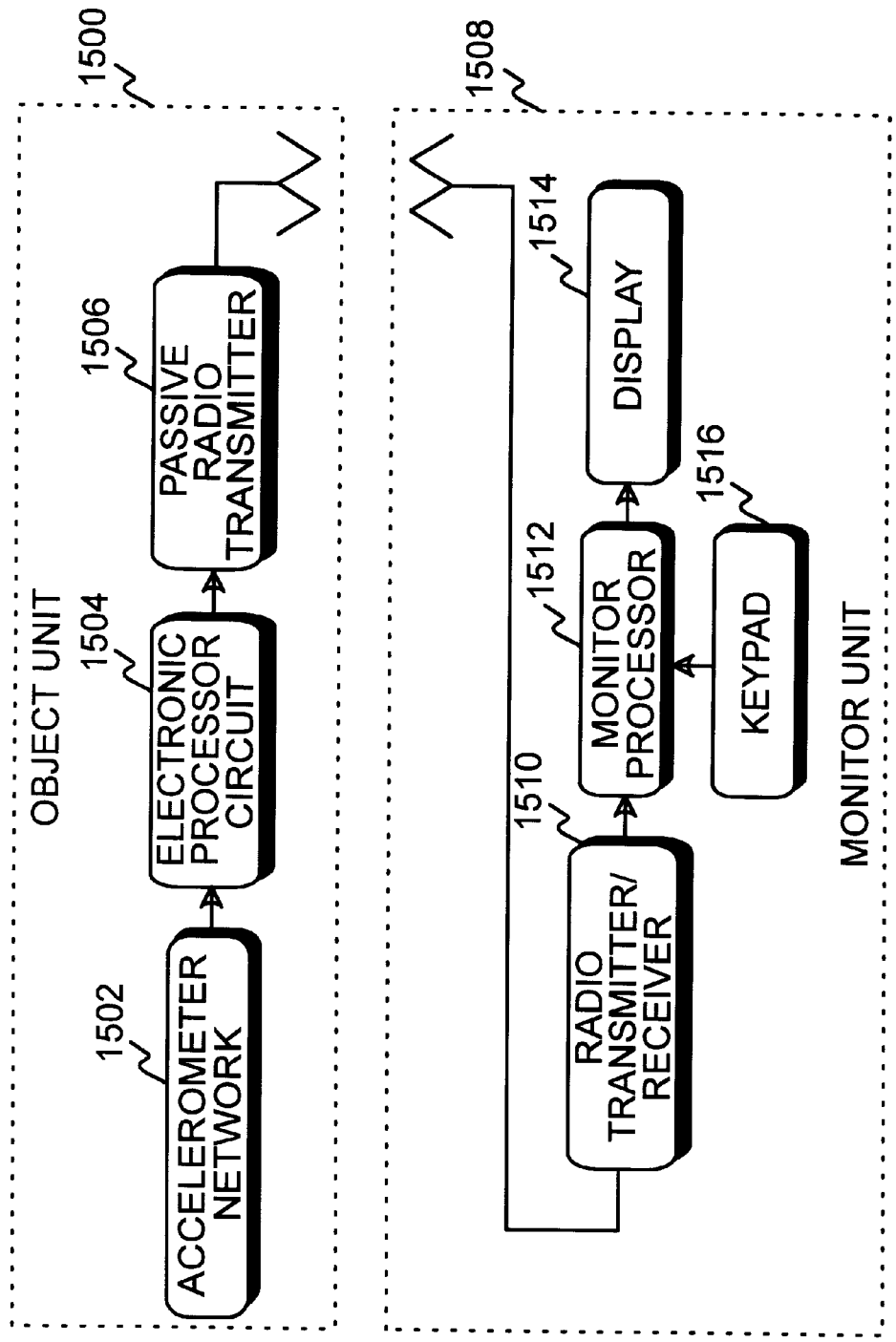
FIG. 15 shows a block diagram of another embodiment of a device for measuring the speed, spin rate, and curve of a movable object of the present invention using a modulated backscatter radio transmission technique.

FIG. 15 shows a block diagram of another embodiment of a device for measuring speed, spin rate, and curve of a movable object using a modulated backscatter radio transmission technique. Referring now to FIG. 15, the invention comprises two main parts: object unit 1500 and monitor unit 1508. The intent of the invention is to provide the user with statistics about the trajectory of a spinning movable object. Object unit 1500 has an accelerometer network 1502 that communicates through an electronic processor circuit 1504 to a passive radio transmitter 1506. Accelerometer network 1502, embedded along with the other components of object unit 1500 within or attached to a movable object, detects centrifugal force, that is, acceleration generated by rotation about an axis.

Monitor unit 1508 has a radio transmitter/receiver 1510 that communicates with a monitor processor 1512. An input keypad 1516 inputs information to monitor processor 1512, and monitor processor 1512 sends information to an output display 1514. Object unit 1500 communicates with monitor unit 1508 through passive radio transmitter 1506 and radio transmitter/receiver 1510. Radio transmitter/receiver 1510 emits a continuous radio frequency sine wave. Passive radio transmitter 1506 is powered by the electromagnetic energy in radio transmitter/receiver 1510's transmissions. Object unit 1500 reflects back the transmissions from monitor unit 1508 and modulates the signal with elapsed time, g-force, and identification code data. This technique, referred to as modulated backscatter, is commonly used with Radio Frequency Identification (RFID) devices.

It is not practical to have monitor unit 1508 always transmitting a continuous wave so that object unit 1500 can piggy back data on it whenever a spin event occurs. Therefore, monitor unit 1508 may be designed to periodically poll object unit 1500 for data, or initiate a polling event in response to a user's request (button press) command to update the display data. For example, monitor unit 1508 may poll object unit 1500 for new spin event data once every 2 seconds. If new spin event data exists, object unit 1500 will transmit that information; otherwise, no data is sent. Once monitor unit 1508 receives the backscattered transmission, the derived statistics are calculated and displayed as described in previous embodiments. In previous embodiments, during a spin event or immediately following a valid spin event, object unit 1500 transmitted information to monitor unit 1508. In this embodiment, instead of transmitting the data, monitor processor 1512 must load passive radio transmitter 1506 with the data to be sent so that it can be relayed to monitor unit 1508 at the next polling.

Monitor unit 1508 in this embodiment can operate in an environment in which there are multiple object units. Commonly available modulated backscatter systems support collision avoidance and collision recovery protocols to handle the case in which multiple object units sense monitor unit 1508's polling and could possibly respond at the same instant. In one collision avoidance technique, monitor unit 1508 transmits the identification code of the object unit it wishes to poll before generating the continuous radio frequency sine wave on which the response will ride. The object unit within transmission range that detects its own identification code will respond to the poll.

Figure 16:
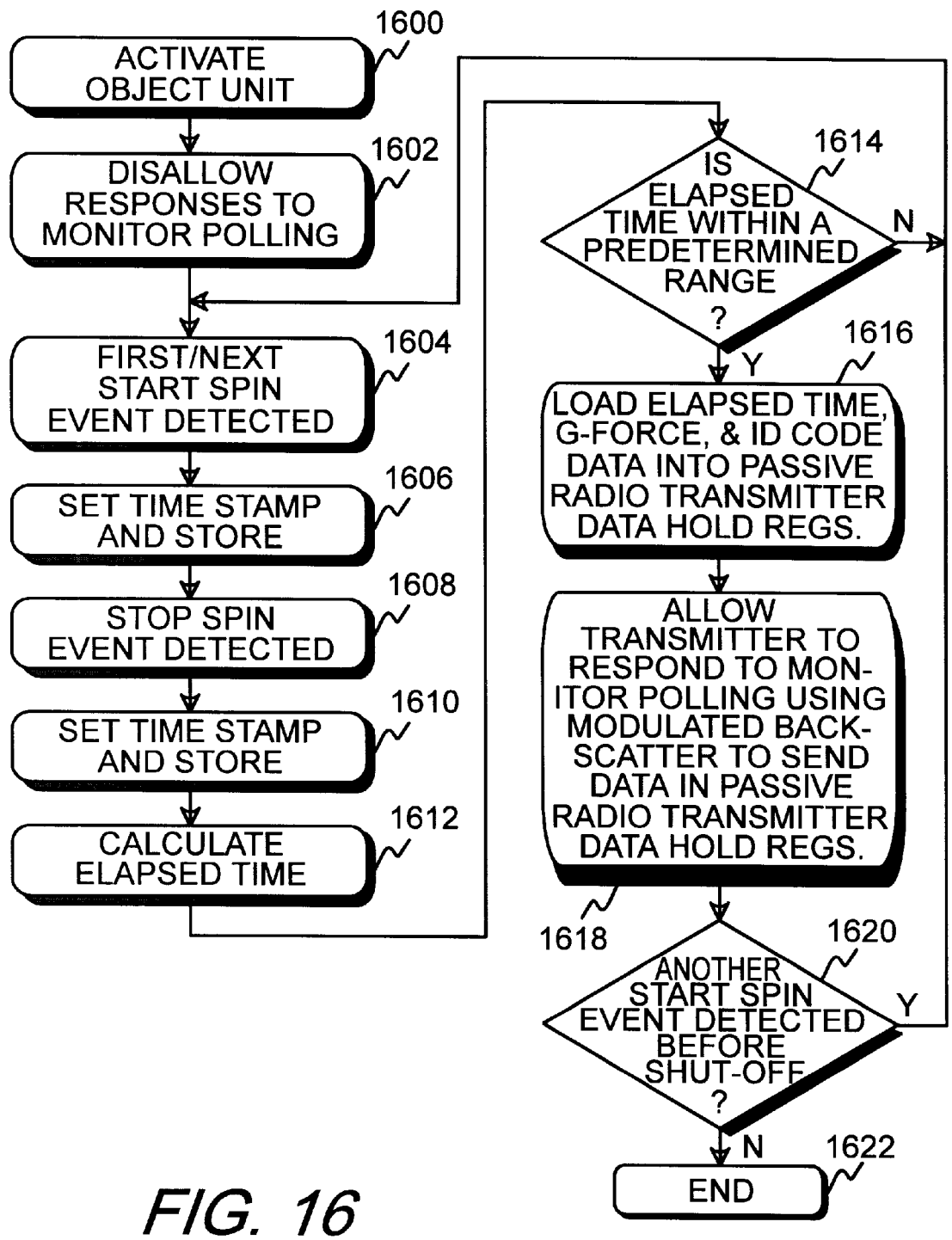
FIG. 16 shows a block diagram of an object unit using a modulated backscatter radio transmission technique for indicating elapsed time between the start and stop of spin and g-force level by the object unit in response to monitor unit polling.

FIG. 16 shows a block diagram of an object unit of FIG. 15 using a modulated backscatter radio transmission technique. Spin, g-force, and identification code data are transferred from the object unit to the monitor unit only when the monitor unit polls for the data and the object unit has new data to send. Spin is detected by utilizing the acceleration network described in FIG. 4.

Referring now to FIG. 16, in block 1600 object unit 1500 (FIG. 15) is activated. In block 1602, object unit 1500 disallows passive radio transmitter 1506 (FIG. 15) from responding to polls by monitor unit 1508 (FIG. 15). The description of blocks 1604 through 1612 is the same as shown in FIG. 11 in corresponding blocks 1102 through 1110.

In block 1614, if the calculated elapsed time is not within a predetermined range, control returns to block 1604. If the elapsed time does fall within a predetermined range, then in block 1616 the spin, g-force, and identification code data is loaded into passive radio transmitter 1506's data hold register. In block 1618, passive radio transmitter 1506 is enabled, allowing it to respond to the next poll by monitor unit 1508. In block 1620, if another start spin event is detected before the predetermined shut-off time (typically one minute), then control returns to block 1604. If not, control passes to block 1622 where object unit 1500 is deactivated through its shut-off circuitry. One skilled in the art will recognize that a new spin event may occur before the poll by monitor unit 1508 occurs, in which case the data being held in passive radio transmitter 1506's data hold register may be overwritten before ever being transferred to monitor unit 1508.

Figure 17:
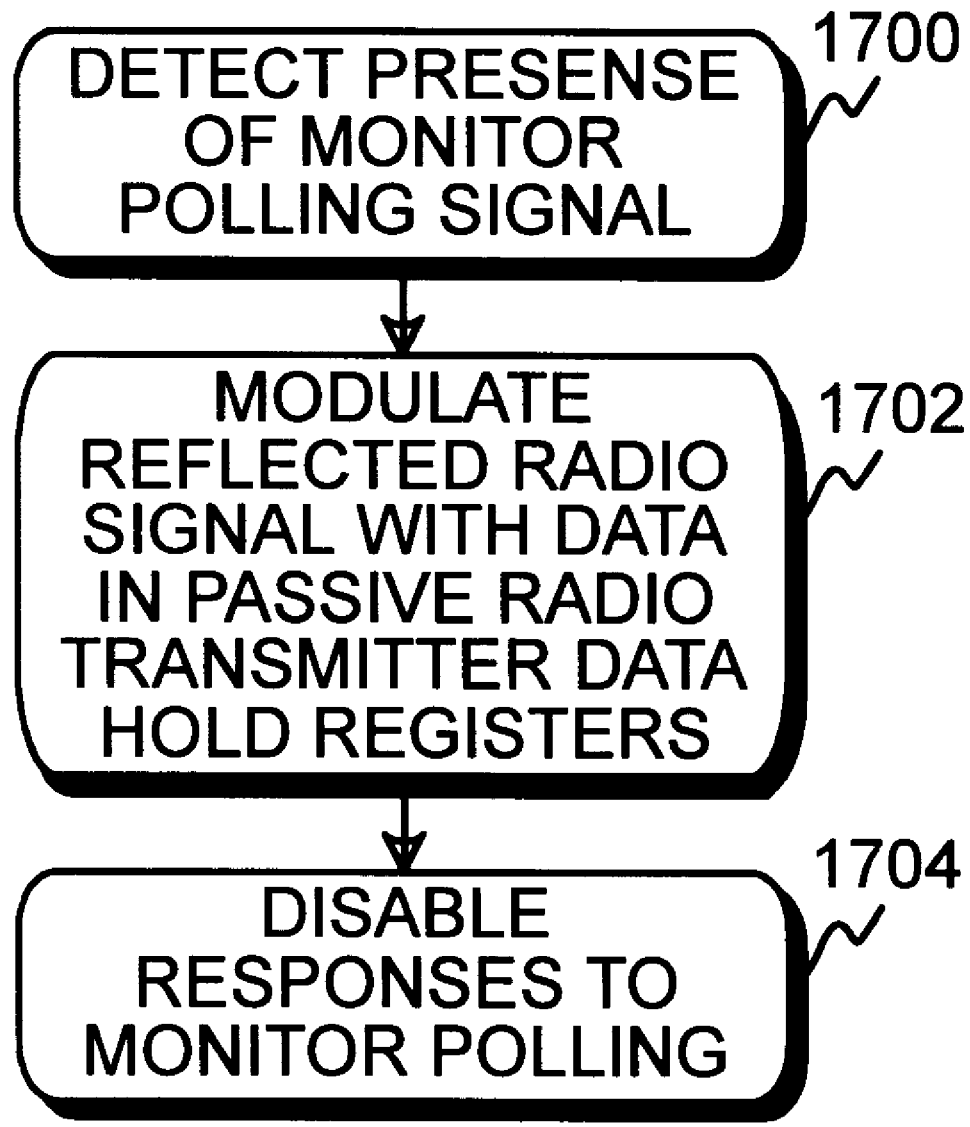
FIG. 17 shows a block diagram of an object unit's response to monitor unit polling utilizing a modulated backscatter radio transmission technique.

FIG. 17 shows the response by object unit 1500 (FIG. 15) to monitor unit 1508 (FIG. 15) polling for the embodiment of the invention which uses modulated backscatter.

Referring now to FIG. 17, once passive radio transmitter 1506 (FIG. 15) of object unit 1500 is enabled in block 1618 (FIG. 16), in block 1700 object unit 1500 watches for the presence of monitor unit 1508's radio frequency transmission. When the radio frequency transmission is detected, in block 1702 passive radio transmitter 1506 modulates the signal that its antenna is reflecting with the data held in passive radio transmitter 1506's data hold register. Anti-collision protocols may be applied at this stage to gracefully recover from the case in which two object units respond simultaneously to the same monitor unit poll. Once done transmitting, in block 1704 passive radio transmitter 1506 is disabled and is not enabled again until in block 1618 (FIG. 16) after new spin event data arrives in block 1616 (FIG. 16).

Figure 18:
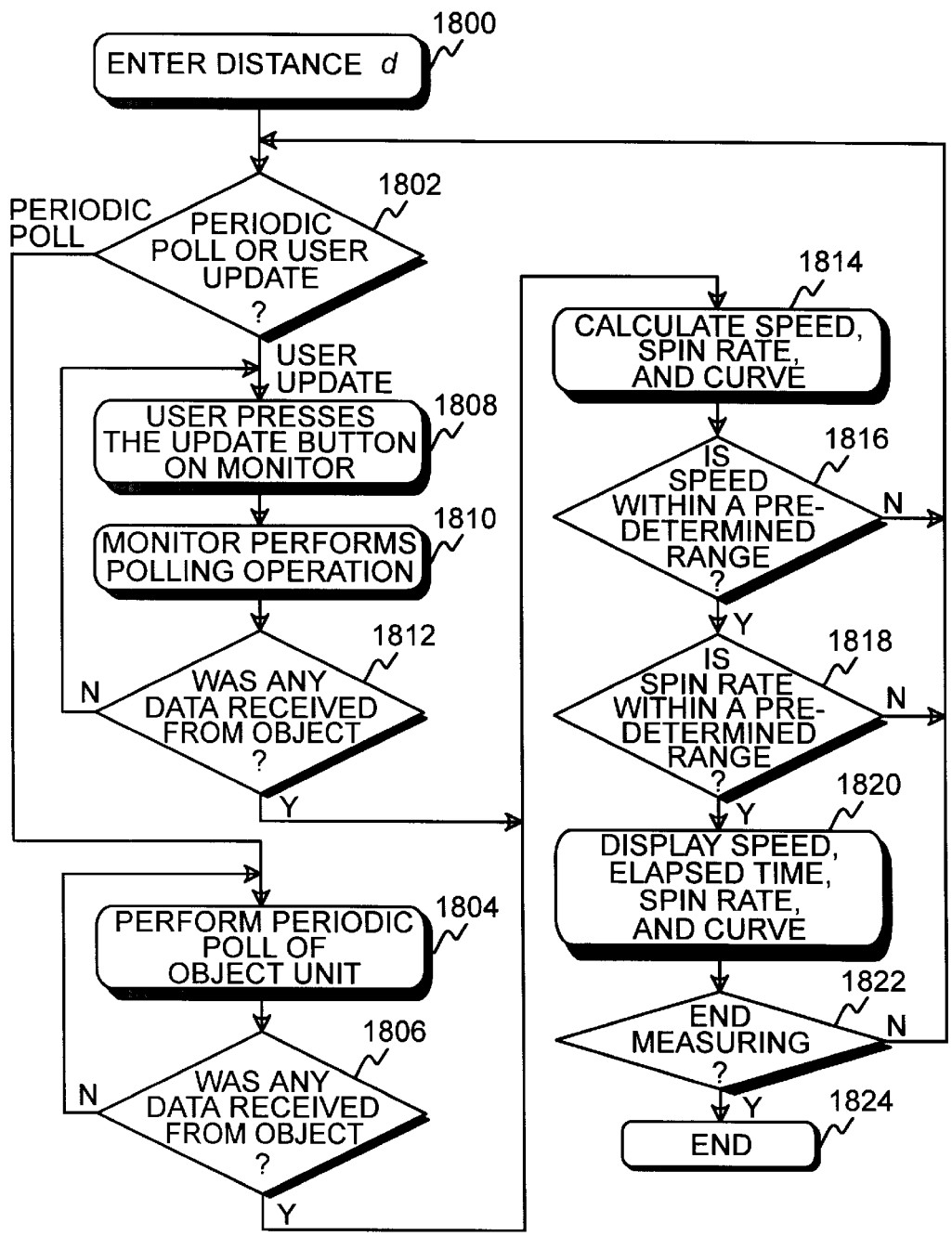
FIG. 18 shows a block diagram of a monitor unit using periodic basis or user initiated polling for the embodiment of the invention which uses modulated backscatter radio transmissions.

FIG. 18 shows a block diagram of monitor unit 1508 (FIG. 15) using periodic basis or user initiated polling for the embodiment of the invention which uses modulated backscatter radio transmissions.

Referring now to FIG. 18, in block 1800 the user enters through numeric keypad 202 (FIG. 2) the distance d between two points where characteristics of the movable object containing object unit 1500 (FIG. 15) are desired to be measured. For a baseball pitch, the distance between the pitcher and catcher would be entered. Block 1802 determines if the user wants to poll object unit 1500 manually by pressing an update button on monitor unit 1508, or if the user wants monitor unit 1508 to periodically poll object unit 1500. In the latter case, control passes to block 1804 where monitor unit 1508 initiates a periodic basis poll, once every two seconds for example. In block 1804, monitor unit 1508 continuously generates an RF sine wave during the polling period and watches for modulation to occur. Detected modulation of the field indicates the presence of object unit 1500 transmitting spin, g-force, and identification code data. Monitor unit 1508 may employ collision avoidance or collision recovery protocols for the case in which multiple object units are within its transmission range. In block 1806, if no data is returned during the polling period, control returns to block 1804 to wait the poll interval (two seconds, for example) before repeating the process. If data is returned, then control passes to block 1814.

If in block 1802 the user wants to poll object unit 1500 manually, control passes to block 1808 where the user initiates a poll by pressing update button 224 (FIG. 2) on keypad 1516 (FIG. 5) of monitor unit 1508. In block 1810 monitor unit 1508 continuously generates an RF sine wave during the polling period and watches for modulation to occur. If no data is returned during the polling period, control returns to block 1808 to wait for the user to press update button 224 again before repeating the process. Detected modulation in block 1812 indicates the presence of object unit 1500 transmitting spin, g-force, and identification code data. Monitor unit 1508 may employ anti-collision protocols for the case in which multiple object units within its transmission range respond simultaneously. If data is returned during the poll, control passes to block 1814. The description of blocks 1814 through 1824 is the same as shown in FIG. 14 in corresponding blocks 1404 through 1414.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A measuring device comprising:
   an object unit secured to a movable object, said object unit comprising
   an accelerometer network that detects at least one spin event of said movable object,
   a electronic processor circuit connected to said accelerometer network, and
   a radio transmitter connected to said electronic processor circuit; and
   a monitor unit external to said object unit comprising
   a radio receiver wherein said object unit communicates with said monitor unit by sending from said radio transmitter at least one radio signal to said radio receiver,
   a monitor processor connected to said radio receiver, wherein said monitor processor determines motion characteristics of said movable object,
   an output display connected to said monitor processor, and
   an input keypad connected to said monitor processor.

2. A measuring device according to claim 1 wherein said object unit is embedded, secured, or attached within a solid movable object of varying densities.

3. A measuring device according to claim 1 wherein said object unit is embedded, secured, or attached within a hollow deformable movable object.

4. A measuring device according to claim 1 wherein said object unit is embedded, secured, or attached within a uniformly solid movable object.

5. A measuring device according to claim 1 wherein said object unit is embedded, secured, or attached within a hollow rigid movable object.

6. A measuring device according to claim 1 wherein said accelerometer network further comprises at least one pair of accelerometers, said at least one pair of accelerometers further comprising a first accelerometer and a second accelerometer located on an axis that passes through a center of said movable object, wherein said first and second accelerometers are equidistant from said center of said movable object, and further wherein said first accelerometer has a direction of sensitivity in a first direction and said second accelerometer has a direction of sensitivity in a second direction opposite from said first direction.

7. A measuring device according to claim 1 wherein internal power to activate said object unit is turned on by motion, wherein said object unit stays activated for a predetermined period of time and shuts off thereafter unless subsequent motion occurs within said predetermined period of time, wherein said object unit stays activated for another said predetermined period of time.

8. A measuring device according to claim 1 wherein said at least one radio signal is non-modulated and persists for the duration of said at least one spin event.

9. A measuring device according to claim 1 wherein said radio transmitter sends to said radio receiver at least one modulated radio signal having a datum indicating the elapsed time of said spin.

10. A measuring device according to claim 1 wherein said monitor unit further comprises:
- an ultrasonic wave transmitter and receiver wherein the distance between the two points over which said movable object is to be measured can be determined by transmitting an ultrasonic wave from said ultrasonic wave transmitter and receiver within said monitor unit located at one of said two points to the other of said two points, wherein said ultrasonic wave is reflected from said other of said two points back to said ultrasonic wave transmitter and receiver,
- a barometer wherein atmospheric pressure readings from said barometer are utilized in determining said motion characteristics,
- a hygrometer wherein humidity readings from said hygrometer are utilized in determining said motion characteristics, and
- a gravity vector detection device wherein said gravity vector is utilized in determining said motion characteristics.

11. A measuring device according to claim 1 wherein said motion characteristics measured include an elapsed time and a speed.

12. A measuring device according to claim 1 wherein said motion characteristics measured include a distance, a trajectory height, a spin rate, and a curve.

13. A measuring device according to claim 1 wherein said radio transmitter is a passive radio transmitter and said radio receiver is a radio transmitter/receiver wherein said radio transmitter/receiver transmits a continuous radio frequency sine wave during a polling period which is reflected back and modulated with data by said passive radio transmitter to said radio transmitter/receiver.

14. A measuring device according to claim 1 wherein said radio transmitter sends to said radio receiver a first non-modulated radio signal of a fixed duration indicating the start of said at least one spin event and a second non-modulated radio signal of said fixed duration indicating the stop of said at least one spin event.

15. A measuring device according to claim 1 wherein said radio transmitter sends to said radio receiver a first non-modulated radio signal of a first duration indicating the start of said at least one spin event and a second non-modulated radio signal of a second duration indicating the stop of said at least one spin event.

16. A measuring device according to claim 6 wherein said at least one pair of accelerometers are selected from the group consisting of piezoelectric, mechanical, and micromachined silicon chip.

17. A measuring device according to claim 6 wherein said at least one pair of accelerometers output a signal proportional to the degree of centrifugal force detected.

18. A measuring device according to claim 9 wherein said at least one modulated radio signal having a datum indicating the elapsed time of said at least one spin event also has a datum indicating the average or peak g-force of said at least one spin event.

19. A measuring device according to claim 9 wherein said radio transmitter sends to said radio receiver a first modulated radio signal having a datum indicating the start of said at least one spin event and a second modulated radio signal having a datum indicating the stop of said at least one spin event.

20. A measuring device according to claim 9 wherein said at least one modulated radio signal further comprises an identification code derived from said object unit, wherein said monitor unit will only process said modulated radio signal when said identification code is recognized by said monitor unit.

21. A measuring device according to claim 20 wherein said monitor unit monitors a plurality of movable objects, each of said plurality of movable objects containing a said object unit, each of said object units having a unique code within said identification code.

22. A method for measuring a movable object comprising the following steps:
- (a) receiving a distance between two points wherein motion characteristics of a movable object moving between said two points are desired to be measured;
- (b) detecting a start of a spin event of said movable object utilizing an accelerometer network secured to said movable object;
- (c) determining a first time for said start of said spin event;
- (d) detecting a stop of said spin event of said movable object utilizing said accelerometer network secured to said movable object;
- (e) determining a second time for said stop of said spin event;
- (f) subtracting said first time from said second time to determine an elapsed time for said spin event; and
- (g) calculating the speed of said movable object by dividing said distance by said elapsed time.

23. A method for measuring a movable object according to claim 22 wherein step (a) further comprises the following step (a1), step (b) further comprises the following step (b1), step (c) further comprises the following steps (c1), (c2), (c3), and (c4), step (e) further comprises the following step (e1), and step (f) further comprise the following step (f1):
- (a1) entering said distance between said two points through an input keypad of a monitor unit, wherein said distance is stored in a monitor processor within said monitor unit connected to said input keypad;
- (b1) locating said accelerometer network within an object unit wherein said object unit is secured to said movable object, and further wherein said monitor unit is located external to said object unit;
- (c1) determining said first time for said start of said spin event by stimulating a radio transmitter within said object unit to transmit a radio signal upon detection of said start of said spin event;
- (c2) receiving said transmitted radio signal in a radio receiver located in said monitor unit;

(c3) setting a first time stamp for said received transmitted radio signal;

(c4) storing said first time stamp in a first position in said monitor processor connected to said radio receiver;

(e1) determining said second time for said stop of said spin event by repeating steps (c1) through (c4) for said stop of said spin event of said movable object, wherein said first time stamp is moved to a second position in said monitor processor and a second time stamp is set for said stop of said spin event and is stored in said first position in said monitor processor; and (f1) determining said elapsed time by subtracting said first time stamp stored in said second position from said second time stamp stored in said first position.

24. A method for measuring a movable object according to claim 22 further comprising the following steps:

(h) displaying said elapsed time of said movable object on an output display; and (i) displaying said speed of said movable object on said output display.

25. A method for measuring a movable object according to claim 22 wherein step (g) is replaced by the following new step (g):

(g) calculating the trajectory height of said movable object.

26. A method for measuring a movable object according to claim 22 wherein step (a) further comprises the following step (a1):

(a1) determining said distance between said two points by transmitting an ultrasonic wave from an ultrasonic wave transmitter and receiver located within a monitor unit located at one of said two points to the other of said two points, wherein said ultrasonic wave is reflected from said other of said two points back to said ultrasonic wave transmitter and receiver, wherein said distance is stored in a monitor processor connected to said ultrasonic wave transmitter and receiver within said monitor unit.

27. A method for measuring a movable object according to claim 23 wherein said radio signals are transmitted for a fixed duration.

28. A method for measuring a movable object according to claim 23 wherein said radio signal transmitted upon detection of said start of said spin event is transmitted for a first duration, and said radio signal transmitted upon detection of said stop of said spin event is transmitted for a second duration.

29. A method for measuring a movable object according to claim 23 wherein said radio signal transmitted upon detection of said start of said spin event is modulated with a datum indicating said start of said spin event, and said radio signal transmitted upon detection of said stop of said spin event is modulated with a datum indicating said stop of said spin event.

30. A method for measuring a movable object according to claim 24 further comprising the following step (h0) performed before step (h):

(h0) comparing said calculated speed in step (g) to a predetermined speed range, and performing steps (h) and (i) only when said calculated speed is within said predetermined speed range.

31. A method for measuring a movable object according to claim 26 further comprising the following steps (h) displaying said elapsed time of said movable object on an output display; and (i) displaying said height achieved of said movable object on said output display.

32. A method for measuring a movable object according to claim 29 wherein said modulated radio signal further comprises an identification code derived from said object unit wherein said radio receiver located in said monitor unit is programmed to only accept said modulated radio signal having said identification code.

33. A method for measuring a movable object according to claim 32 wherein said monitor unit monitors a plurality of movable objects, each of said plurality of movable objects containing a said object unit, each of said object units having a unique code within said identification code recognized by said monitor unit.

34. A method for measuring a movable object according to claim 22 wherein step (a) further comprises the following step (a1), step (b) further comprises the following step (b1), step (c) further comprises the following step (c1), step (e) further comprises the following step (e1), step (f) further comprise the following step (f1), and step (g) further comprises the following steps (g1), (g2), and (g3):

(a1) entering said distance between said two points through an input keypad of a monitor unit, wherein said distance is stored in a monitor processor within said monitor unit connected to said input keypad;

(b1) locating said accelerometer network within an object unit wherein said object unit is secured to said movable object, and further wherein said monitor unit is located external to said object unit;

(c1) determining said first time for said start of said spin event by setting a first time stamp and storing said first time stamp in a first position in an electronic processor circuit connected to said accelerometer network;

(e1) determining said second time for said stop of said spin event by setting a second time stamp, wherein said first time stamp is moved to a second position in said electronic processor circuit and said second time stamp is stored in said first position in said electronic processor circuit;

(f1) determining said elapsed time by subtracting said first time stamp stored in said second position from said second time stamp stored in said first position;

(g1) transmitting a radio signal modulated with a datum indicating said elapsed time of said spin event to a monitor unit;

(g2) receiving said transmitted radio signal containing said elapsed time datum in a radio receiver located in said monitor unit; and (g3) transferring said elapsed time datum to said monitor processor and calculating said speed of said movable object in said monitor processor.

35. A method for measuring a movable object according to claim 34 further comprising the following step (g0) performed before step (g1):

(g0) comparing said elapsed time determined in step (f1) to a predetermined time range, and performing steps (g1), (g2), and (g3) only when said elapsed time is within said predetermined time range.

36. A method for measuring a movable object according to claim 34 further comprising the following steps:

(h) displaying said speed of said movable object on an output display, and (i) displaying said elapsed time of said movable object on said output display.

37. A method for measuring a movable object according to claim 34 wherein step (g1) further comprises the following step (g1a), step (g2) further comprises the following step (g2a), and further comprises the following steps (h) and (i):

(g1a) transmitting said modulated radio signal with a datum indicating the peak or average centrifugal g-force detected by said accelerometer network for said spin event to said monitor unit;

(g2a) receiving said transmitted modulated radio signal also containing said peak or average centrifugal g-force datum in said radio receiver located in said monitor unit;

(h) calculating a spin rate for said movable object by utilizing said peak or average centrifugal g-force datum from step (g2a); and (i) calculating a curve for said movable object by utilizing said spin rate from step (h).

38. A method for measuring a movable object according to claim 36 further comprising the following step (h0) performed before step (h):

(h0) comparing said calculated speed in step (g3) to a predetermined speed range, and performing steps (h) and (i) only when said calculated speed is within said predetermined speed range.

39. A method for measuring a movable object according to claim 37 wherein step (i) further comprises the following steps (i1), (i2), (i3), (i4), (i5), and (i6):

(i1) determining a gravity vector from a gravity vector determining device located within said object unit;

(i2) determining an axis of rotation vector from said accelerometer network;

(i3) determining a direction of flight vector by measuring a translational acceleration of said movable object with said accelerometer network;

(i4) comparing said axis of rotation vector with said gravity vector and comparing said direction of flight vector with said gravity vector to determine a direction of said curve;

(i5) calculating said curve; and (i6) displaying said curve and said direction of said curve on an output display.

40. A method for measuring a movable object according to claim 37 further comprising the following steps:

(j) displaying said spin rate of said movable object on said output display and (k) displaying said curve of said movable object on an said output display.

41. A method for measuring a movable object according to claim 40 further comprising the following step (j0) performed before step (j):

(j0) comparing said spin rate calculated in step (h) to a predetermined spin rate range, and performing steps (j) and (k) only when said spin rate calculated is within said predetermined spin rate range.

42. A method for measuring a movable object according to claim 22 wherein step (a) further comprises the following step (a1), step (b) further comprises the following step (b1), step (c) further comprises the following step (c1), step (e) further comprises the following step (e1), step (f) further comprise the following steps (f1) and (f2), and step (g) further comprises the following steps (g1), (g2), and (g3):

(a1) entering said distance between said two points through an input keypad of a monitor unit, wherein said distance is stored in a monitor processor within said monitor unit connected to said input keypad;

(b1) locating said accelerometer network within an object unit wherein said object unit is secured to said movable object, and further wherein said monitor unit is located external to said object unit;

(c1) determining said first time for said start of said spin event by setting a first time stamp and storing said first time stamp in a first position in an electronic processor circuit connected to said accelerometer network;

(e1) determining said second time for said stop of said spin event by setting a second time stamp, wherein said first time stamp is moved to a second position in said electronic processor circuit and said second time stamp is stored in said first position in said electronic processor circuit;

(f1) determining said elapsed time by subtracting said first time stamp stored in said second position from said second time stamp stored in said first position;

(f2) loading said elapsed time into a data hold register of a passive radio transmitter connected to said electronic processor circuit;

(g1) calculating said speed of said movable object by polling said object unit by transmitting a continuous radio signal from a radio transmitter/receiver in said monitor unit for a polling period;

(g2) receiving said transmitted continuous radio signal in said object unit, wherein said object unit modulates said continuous radio signal with said elapsed time stored in said data hold register and reflects said modulated continuous radio signal back to said monitor unit; and (g3) receiving said modulated continuous radio signal carrying said elapsed time with said radio transmitter/receiver in said monitor unit and calculating said speed of said movable object in said monitor processor.

43. A method for measuring a movable object according to claim 42 wherein step (f1) further comprises the following step (f1a):

(f1a) comparing said elapsed time determined in step (f1) to a predetermined time range, and performing steps (f2), (g1), (g2), and (g3) only when said elapsed time is within said predetermined time range.

44. A method for measuring a movable object according to claim 42 further comprising the following steps:

(h) displaying said speed of said movable object on an output display, and (i) displaying said elapsed time of said movable object on said output display.

45. A method for measuring a movable object according to claim 42 wherein step (f2) further comprises the following step (f2a), step (g2) further comprises the following step (g2a), and further comprises the following steps (h) and (i):

(f2a) loading a peak or average centrifugal g-force detected by said accelerometer network for said spin event into said data hold register;

(g2a) modulating said continuous radio signal with said peak or average centrifugal g-force stored in said data hold register and reflecting said modulated continuous radio signal carrying said elapsed time and said peak or average centrifugal g-force back to said monitor unit;

(h) calculating a spin rate for said movable object by utilizing said peak or average centrifugal g-force from step (g2a); and (i) calculating a curve for said movable object by utilizing said spin rate from step (h).

46. A method for measuring a movable object according to claim 42 wherein step (g1) further comprises the following step (g1a):

(g1a) polling said object unit by transmitting said continuous radio signal for said polling period on a periodic basis.

47. A method for measuring a movable object according to claim 42 wherein step (g1) further comprises the following step (g1a):
- (g1a) polling said object unit by transmitting said continuous radio signal for said polling period only upon receiving a command to update said output display.

48. A method for measuring a movable object according to claim 42 further comprising the following step (c0) performed before step (c1) and step (f2) further comprises the following step (f2a):
- (c0) disabling said object unit from responding to polling by said monitor unit; and
- (f2a) enabling said object unit to respond to polling from said monitor unit.

49. A method for measuring a movable object according to claim 44 further comprising the following step (h0) performed before step (h):
- (h0) comparing said calculated speed in step (g3) to a predetermined speed range, and performing steps (h) and (i) only when said calculated speed is within said predetermined speed range.

50. A method for measuring a movable object according to claim 45 wherein step (i) further comprises the following steps (i1), (i2), (i3), (i4), (i5), and (i6):
- (i1) determining a gravity vector from a gravity vector determining device located within said object unit;
- (i2) determining an axis of rotation vector from said accelerometer network;
- (i3) determining a direction of flight vector by measuring a translational acceleration of said movable object with said accelerometer network;
- (i4) comparing said axis of rotation vector with said gravity vector and comparing said direction of flight vector with said gravity vector to determine a direction of said curve;
- (i5) calculating said curve; and
- (i6) displaying said curve and said direction of said curve on an output display.

51. A method for measuring a movable object according to claim 45 further comprising the following steps:
- (j) displaying said spin rate of said movable object on an output display and
- (k) displaying said curve of said movable object on said output display.

52. A method for measuring a movable object according to claim 51 further comprising the following step (j0) performed before step (j):
- (j0) comparing said spin rate calculated in step (h) to a predetermined spin rate range, and performing steps (j) and (k) only when said spin rate calculated is within said predetermined spin rate range.

53. A method for measuring a movable object comprising the following steps:
- (a) receiving a distance between two points wherein motion characteristics of a movable object between said two points are desired to be measured;
- (b) detecting a spin event of said movable object utilizing an accelerometer network secured to said movable object;
- (c) stimulating a radio transmitter to transmit a continuous radio signal upon detection of a start of said spin event until detection of a stop of said spin event;
- (d) measuring the duration of said continuous radio signal to determine the elapsed time of said spin event, and;
- (e) calculating the speed of said movable object by dividing said distance by said elapsed time.

54. A method for measuring a movable object according to claim 53 wherein step (a) further comprises the following step (a1), step (b) further comprises the following step (b1), step (c) further comprises the following step (c1), step (d) further comprises the following step (d1), and step (e) further comprises the following step (e1):
- (a1) entering said distance between said two points through an input keypad of a monitor unit, wherein said distance is stored in a monitor processor within said monitor unit connected to said input keypad;
- (b1) locating said accelerometer network within an object unit wherein said object unit is secured to said movable object, and further wherein said monitor unit is located external to said object unit;
- (c1) receiving said transmitted continuous radio signal in a radio receiver located in said monitor unit;
- (d1) measuring said duration of said continuous radio signal in said monitor processor connected to said radio receiver, and
- (e1) calculating said speed in said monitor processor.

55. A method for measuring a movable object according to claim 53 wherein step (a) further comprises the following step (a1):
- (a1) determining said distance between said two points by transmitting an ultrasonic wave from an ultrasonic wave transmitter and receiver located within a monitor unit located at one of said two points to the other of said two points, wherein said ultrasonic wave is reflected from said other of said two points back to said ultrasonic wave transmitter and receiver, wherein said distance is stored in a monitor processor connected to said ultrasonic wave transmitter and receiver within said monitor unit.

56. A method for measuring a movable object according to claim 53 further comprising the following steps:
- (f) displaying said elapsed time of said movable object on an output display; and
- (g) displaying said speed of said movable object on said output display.

57. A method for measuring a movable object according to claim 53 wherein step (e) is replaced by the following new step (e):
- (e) calculating the height achieved by said movable object.

58. A method for measuring a movable object according to claim 56 further comprising the following step (f0) performed before step (f1):
- (f0) comparing said calculated speed in step (e) to a predetermined speed range, and performing steps (f) and (g) only when said calculated speed is within said predetermined speed range.

59. A speed sensing device comprising:
- an accelerometer network for detecting centrifugal force from the launching of said device through the subsequent stopping thereof;
- a processor in communication with said accelerometer network, wherein said processor calculates the average speed of said device over the travel of said device; and
- a display in communication with said processor for displaying said calculated average speed.

60. The speed sensing device of claim 59 wherein said communication between said accelerometer network and said processor comprises radio transmission.

* * * * *